United States Patent
Wan et al.

(10) Patent No.: US 12,423,873 B2
(45) Date of Patent: Sep. 23, 2025

(54) METHOD FOR CONSTRUCTING MORTON CODES, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Shuai Wan, Guangdong (CN); Junyan Huo, Guangdong (CN); Yanzhuo Ma, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 450 days.

(21) Appl. No.: 17/853,166

(22) Filed: Jun. 29, 2022

(65) Prior Publication Data
US 2022/0327746 A1 Oct. 13, 2022

Related U.S. Application Data

(63) Continuation of application No. PCT/CN2021/070964, filed on Jan. 8, 2021.
(Continued)

(51) Int. Cl.
*G06T 9/00* (2006.01)
*G06F 1/03* (2006.01)
*G06F 5/01* (2006.01)

(52) U.S. Cl.
CPC .............. *G06T 9/001* (2013.01); *G06F 1/03* (2013.01); *G06F 5/01* (2013.01)

(58) Field of Classification Search
CPC .......... G11C 19/00; G06T 9/00; G06T 9/001; G06T 9/40; G06T 17/00; G06F 1/025; G06F 1/03; G06F 5/01
See application file for complete search history.

(56) References Cited

U.S. PATENT DOCUMENTS

| 8,768,080 B2 * | 7/2014 | He ........................ H04N 19/50 382/250 |
| 9,772,849 B2 * | 9/2017 | Evans ................. G06F 9/30038 |

(Continued)

FOREIGN PATENT DOCUMENTS

| CN | 103136535 A | 6/2013 |
| CN | 106156138 A | * 11/2016 |

(Continued)

OTHER PUBLICATIONS

Kim et al. "Efficient encoding and decoding extended geocodes for massive point cloud data." 2019 IEEE International Conference on Big Data and Smart Computing (BigComp). IEEE, 2019. (Year: 2019).*

(Continued)

*Primary Examiner* — Stephen R Koziol
*Assistant Examiner* — Benedict E Lee
(74) *Attorney, Agent, or Firm* — Young Basile Hanlon & MacFarlane, P.C.

(57) ABSTRACT

Provided are a method for constructing a Morton code, an encoder, decoder and computer storage medium. The encoder determines geometric information of a current point in a point cloud; determines an index value corresponding to a coordinate component according to the coordinate component in the geometric information; determines a Morton code component corresponding to the coordinate component according to the index value and a Morton code lookup table; determines a Morton code of the current point according to the Morton code component. The encoder analyzes a bitstream to determine geometric information of a current point in a point cloud; determines an index value corresponding to a coordinate component according to the coordinate component in geometric information; determines a Morton code component corresponding to the coordinate (Continued)

component according to the index value and a Morton code lookup table; determines a Morton code of the current point according to Morton code component.

18 Claims, 5 Drawing Sheets

Related U.S. Application Data

(60) Provisional application No. 62/958,589, filed on Jan. 8, 2020.

(56) References Cited

U.S. PATENT DOCUMENTS

| | | | | |
|---|---|---|---|---|
| 10,417,821 | B2* | 9/2019 | Legrand | G06T 17/205 |
| 10,848,696 | B2* | 11/2020 | Lee | H04N 19/59 |
| 10,853,973 | B2* | 12/2020 | Tourapis | G06T 9/00 |
| 11,010,928 | B2* | 5/2021 | Mammou | G06T 9/00 |
| 11,756,234 | B2* | 9/2023 | Ricard | G06T 9/001 |
| | | | | 382/232 |
| 2016/0139924 | A1* | 5/2016 | Evans | G06F 9/30134 |
| | | | | 712/205 |
| 2017/0347100 | A1 | 11/2017 | Chou et al. | |
| 2018/0144545 | A1 | 5/2018 | Legrand et al. | |
| 2019/0080483 | A1* | 3/2019 | Mammou | G06T 3/4007 |
| 2019/0311499 | A1* | 10/2019 | Mammou | G06T 7/50 |
| 2019/0311501 | A1* | 10/2019 | Mammou | G06T 9/001 |
| 2023/0196625 | A1* | 6/2023 | Li | G06T 9/004 |
| | | | | 382/232 |

FOREIGN PATENT DOCUMENTS

| | | | | |
|---|---|---|---|---|
| CN | 107111485 A | | 8/2017 | |
| CN | 107111489 A | * | 8/2017 | ......... G06F 9/30018 |
| CN | 109345619 A | | 2/2019 | |
| JP | 6696674 B2 | * | 5/2020 | ......... G06F 9/30018 |
| JP | 6903014 B2 | * | 7/2021 | ........... G06T 17/005 |
| TW | 201633114 A | | 9/2016 | ......... G06F 9/30018 |
| TW | 201633115 A | | 9/2016 | ......... G06F 9/30018 |
| WO | WO-2016177959 A1 | * | 11/2016 | ........... G06T 17/005 |

OTHER PUBLICATIONS

ISO/IEC JTC1/SC29/WG11 MPEG2019/m46245, Sony Corporation, [G-PCC] On Morton Code Derivation, Jan. 2019. (5 pages).
ISO/IEC JTC1/SC29/WG11 MPEG2019/m52300, Xidian University, Northwestern Polytechnic University, Guandong OPPO Mobile Telecommunications Corp., Ltd, [G-PCC] A unification of Morton Code LUTs, Jan. 2020. (9 pages).
ISO/IEC JTC 1/SC 29/WG 11 N18882, G-PCC test model v8 user manual, 3DG, Dec. 6, 2019. (13 pages).
ISO/IEC JTC 1/SC 29/WG11, N18891, 3DG, Dec. 13, 2019. (74 pages).
Morton encoding/decoding through bit interleaving: Implementation, Jeroen Baert's Blog, Oct. 7, 2013. (1-15 pages).
Libmorton/morton3 forceflow, Fix bugs in 2D and 3D LUT shifted ET menthods, Apr. 4, 2023. (6 pages).
Extended European Search Report for EP Application 21738556.6 mailed Apr. 18, 2023. (12 pages).
Written Opinion of the International Searching Authority with English Translation for PCT/CN2021/070964 mailed Apr. 9, 2021.
International Search Report with English Translation for PCT/CN2021/070964 mailed Apr. 8, 2021.

* cited by examiner

METHOD FOR CONSTRUCTING MORTON CODES, ENCODER, DECODER, AND STORAGE MEDIUM

CROSS-REFERENCE TO RELATED APPLICATION(S)

The present application is a continuation application of International PCT Application No. PCT/CN2021/070964, filed on Jan. 8, 2021, which claims priority of U.S. Provisional Patent Application No. 62/958,589 entitled "POINT CLOUD ENCODING AND DECODING METHOD AND APPARATUS" and filed on Jan. 8, 2020. The above-identified applications are incorporated herein by reference in their entireties.

TECHNICAL FIELD

Embodiments of the present application relate to encoding and decoding technologies in the communication field, and more particularly, to a method for constructing a Morton code, an encoder, a decoder and a storage medium.

BACKGROUND

In a geometry-based point cloud compression (G-PCC) encoder framework, geometric information of point clouds and attribute information corresponding to each of the point clouds are encoded separately. After geometric encoding is completed, the geometric information is reconstructed, and encoding of the attribute information will depend on the reconstructed geometric information.

At present, a Morton code of any point in a point cloud is needed during both octree geometric encoding and decoding and attribute information encoding and decoding. However, a process of constructing the Morton code using multiple lookup tables greatly increases the computational complexity and storage space, thereby reducing the encoding and decoding efficiency.

SUMMARY

Embodiments of the present application provide a method for constructing a Morton code, an encoder, a decoder and a storage medium, which can reduce the computational complexity and storage space effectively, and thereby improve the encoding and decoding efficiency.

Technical schemes of the embodiments of the present application may be implemented as follows.

In a first aspect, an embodiment of the present application provides a method for constructing a Morton code, which is applied in an encoder and includes: determining geometric information of a current point in a point cloud; determining an index value corresponding to a coordinate component according to the coordinate component in the geometric information; determining a Morton code component corresponding to the coordinate component according to the index value and a Morton code lookup table; and determining a Morton code of the current point according to the Morton code component.

In a second aspect, an embodiment of the present application further provides a method for constructing a Morton code, which is applied in a decoder and includes: parse a bitstream to determine geometric information of a current point in a point cloud; determining an index value corresponding to a coordinate component according to the coordinate component in the geometric information; determining a Morton code component corresponding to the coordinate component according to the index value and a Morton code lookup table; and determining a Morton code of the current point according to the Morton code component.

In a third aspect, an embodiment of the present application further provides an encoder including a first determining part.

The first determining part is configured to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

In a fourth aspect, an embodiment of the present application provides an encoder including a first processor and a first memory storing instructions executable by the first processor, wherein the instructions, when executed, cause the first processor to perform the method for constructing the Morton code as described above.

In a fifth aspect, an embodiment of the present application further provides a decoder including a decoding part and a second determining part.

The decoding part is configured to parse a bitstream.

The second determining part is configured to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

In a sixth aspect, an embodiment of the present application provides a decoder including a second processor and a second memory storing instructions executable by the second processor, wherein the instructions, when executed, cause the second processor to perform the method for constructing the Morton code as described above.

In a seventh aspect, an embodiment of the present application provides a computer-readable storage medium having stored thereon a program, applied in an encoder, wherein when the program is executed by a first processor, the method for constructing the Morton code as described above is implemented.

In an eighth aspect, an embodiment of the present application provides a computer-readable storage medium having stored thereon a program, applied in a decoder, wherein when the program is executed by a second processor, the method for constructing the Morton code as described above is implemented.

The embodiments of the present application disclose a method for constructing a Morton code, an encoder, a decoder and a computer storage medium. The encoder determines geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. The encoder parses a bitstream to determine geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

DETAILED DESCRIPTION

Figure 1:
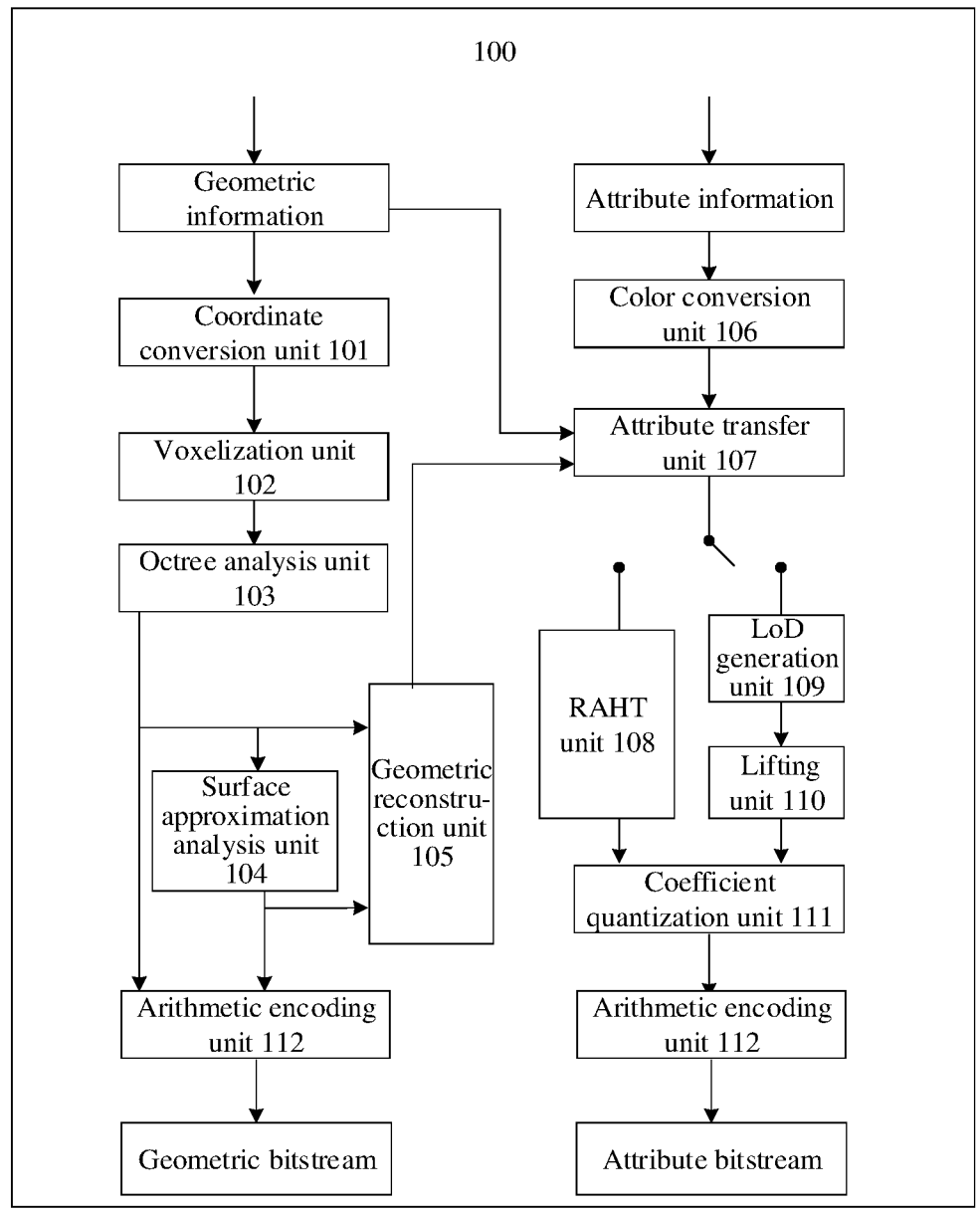
FIG. 1 is a block diagram of a structure of a G-PCC encoder system 100.

In order to understand features and technical contents of embodiments of the present application in more detail, implementations of the embodiments of the present application will be described in detail below in combination with the accompanying drawings, which are for reference only and are not intended to limit the embodiments of the present application.

In an embodiment of the present application, in a G-PCC encoder framework, a point cloud of an input three-dimensional image model is partitioned into slices, and each of the slices is encoded independently.

In the process of G-PCC encoding, point cloud data to be encoded are firstly partitioned into a plurality of slices by slice partitioning. In each of the slices, geometric information of a point cloud and attribute information corresponding to each point cloud are encoded separately. In the process of geometric encoding, coordinate conversion is performed on the geometric information to cause all of the point cloud to be contained in a bounding box, and then the point cloud is quantized. The quantization in this step mainly plays a role in scaling. Because of quantization rounding, the geometric information of a portion of the point cloud is the same, thus whether replicated points are removed is determined based on a parameter. The process of quantization and removing the replicated points is also called a voxelization process. Then, octree partitioning is performed on the bounding box. In an octree-based geometric information encoding process, the bounding box is partitioned equally into eight sub-cubes, and a non-empty sub-cube (containing points in the point cloud) continues to be partitioned into eight equal portions until the partitioned leaf nodes are unit cubes of 1×1×1. Then points in the leaf nodes are arithmetically encoded to generate a binary geometric bit stream, i.e., geometric bitstream. In a triangle soup (trisoup)-based geometric information encoding process, octree partitioning will also be performed first. However, unlike the octree-based geometric information encoding, in the trisoup-based geometric information encoding process, the point cloud is partitioned into blocks (sub-blocks) until side lengths of the blocks are W, instead of being partitioned step by step into unit cubes of 1×1×1. At most twelve vertices generated by a surface formed by distribution of point cloud in each block and twelve edges of the block are obtained, and the vertices are arithmetically encoded (surface fitting is performed based on the vertices) to generate a binary geometric bit stream, i.e., geometric bitstream. The vertices are also used in implementation of a geometric reconstruction process, and the reconstructed geometric information is used when attribute of the point cloud is encoded.

Geometric encoding is completed in the attribute encoding process, and color conversion is performed after the geometric information is reconstructed, to convert color information (i.e., attribute information) from a RGB color space to a YUV color space. Then, the point cloud is recolored using the reconstructed geometric information, so that the attribute information that is not encoded corresponds to the reconstructed geometric information. Attribute encoding is mainly performed on the color information. In the color information encoding process, there are mainly two transform approaches, one is distance-based lifting transform which depends on Level of Detail (LOD) partitioning, and the other is region adaptive hierarchal transform (RAHT) that is directly performed. In both of the two approaches, the color information will be converted from the spatial domain to the frequency domain to obtain a high-frequency coefficient and low-frequency coefficient through the transform, and finally the coefficients are quantized (i.e., quantized coefficients). Finally, after slice synthesis of geometric encoding data, processed through octree partitioning and surface fitting, and attribute encoding data, processed through the quantized coefficients, is completed, vertex coordinates of each block are encoded sequentially (i.e., arithmetically encoded) to generate a binary attribute bit stream, i.e., attribute bitstream.

In the process of G-PCC decoding, first geometric bitstream and attribute bitstream in the acquired binary bitstream are decoded independently. When the geometric bitstream is decoded, the geometric information of the point cloud is obtained through arithmetic decoding-octree synthesis-surface fitting-geometric reconstruction-inverse coordinate conversion. When the attribute bitstream is decoded, the attribute information of the point cloud is obtained through arithmetic decoding-inverse quantization-LOD-based inverse lifting transform or RAHT-based inverse transform-inverse color conversion. The three-dimensional image model of the point cloud data to be encoded is restored based on the geometric information and the attribute information.

Morton codes are also called z-order codes because they are encoded in a spatial z-order. In a G-PCC encoder 300 and a decoder 400, acquisition of the Morton codes is started in the following process.

(1) Octree Geometric Encoding (Decoding)

In the octree geometric encoding (decoding) process, a Morton code of a sub-node in the octree is firstly calculated based on quantized geometric coordinates of the point cloud. In order to predict occupancy information of a certain node, neighbor search is performed based on the obtained Morton codes.

(2) Attribute Encoding (RAHT)

In the current G-PCC framework, the reconstructed geometric information (i.e., the geometric coordinates of the point cloud) has been obtained at the encoder side before attribute encoding is performed. In order to perform RAHT, Morton codes corresponding to the reconstructed point cloud are first calculated. Then, RAHT is performed on attributes (e.g., colors) of pairs of adjacent nodes in space, wherein a relationship between the pairs of adjacent nodes is determined based on the Morton codes.

Specifically, before RAHT is performed, the geometric coordinate information of the point cloud has been obtained. A Morton code corresponding to each point in the point cloud may be obtained using coordinate information of the point.

(3) Attribute Encoding (Lifting Transform)

When the attribute information is processed using lifting transform, a Morton code corresponding to each point in the reconstructed point cloud is first calculated. Then, in order to structure the point cloud as LODs (Levels of Detail), all points in the point cloud are sorted in an ascending order of values of Morton codes of the all points. An array of point indexes may be obtained according to this order. The point indexes stored in the array are traversed sequentially until all points are accessed and assigned to some LODs. Finally, the generated LODs may be used for attribute prediction.

A specific way for calculating the Morton codes is described as follows. For a point in a point cloud, a Morton code m with a triple variable (s, t, u) and bit precision i is expressed by the following formula:

$$m = \Sigma_i 2^{3i+2}[s \& 2^i] + 2^{3i+1}[t \& 2^i] + 2^{3i}[u \& 2^i] \quad (1)$$

More specifically, the Morton code is obtained by interleaving binarized values of components s, t and u. For example, an example of this process is given in Table 1, wherein the bit precision of each component is 2.

TABLE 1

3D Morton Code m constructed based on (s, t, u)

| Bit string form | | | Integer form | |
|---|---|---|---|---|
| S | T | U | m | m |
| 00 | 00 | 00 | 000000 | 0 |
| 00 | 00 | 01 | 000001 | 1 |
| 10 | 01 | 10 | 101010 | 42 |
| 10 | 01 | 11 | 101011 | 43 |
| 11 | 10 | 00 | 110100 | 52 |
| 11 | 10 | 01 | 110101 | 53 |
| 01 | 11 | 10 | 011110 | 30 |
| 01 | 11 | 11 | 011111 | 31 |
| $s_n \ldots s_1 s_0$ | $t_n \ldots t_1 t_0$ | $u_n \ldots u_1 u_0$ | $s_n t_n u_n \ldots s_1 t_1 u_1 s_0 t_0 u_0$ | ... |

For G-PCC, the triple variable (s, t, u) may be a three-dimensional coordinate (x, y, z) of a certain point in a point cloud. Its Morton code is constructed using three Morton code lookup tables Tx, Ty and Tz, each of which corresponds to a component (x, y or z), for example, Tx corresponds to x, Ty corresponds to y, and Tz corresponds to z. Specifically, the binarized value of x may be used as an index for searching for a required entry Mx in the Morton code lookup table Tx. The binarized value of y may be used as an index for searching for a required entry My in the Morton code lookup table Ty. The binarized value of z may be used as an index for searching for a required entry Mz in the Morton code lookup table Tz. Finally, the Morton code of this point is obtained by performing bitwise OR operation on Mx, My, and Mz.

In G-PCC, the maximum geometric precision of point coordinates in the point cloud is 24 bits.

At present, there are three modules in G-PCC (graphics-based point cloud encoding) that use Morton codes in the point cloud encoding process, wherein encoding of the point cloud includes octree geometric encoding/decoding, attribute encoding using RAHT (region adaptive hierarchical transform) and attribute encoding using lifting transform. However, in implementation of a G-PCC codec, the Morton codes are acquired using three large lookup tables, resulting in large storage consumption and high computational complexity.

That is to say, a Morton code of any point in the point cloud needs to be used during both octree geometric encoding and decoding and attribute information encoding and decoding. However, the process of constructing the Morton code using multiple lookup tables greatly increases the computational complexity and storage space, thereby reducing the encoding and decoding efficiency.

In order to overcome the above defects, in the embodiments of the present application, when the Morton code of the current point is constructed, the encoder and the decoder may look up the same Morton code lookup table using an index value corresponding to each coordinate component in the geometric information of the current point to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

FIG. 1 is a block diagram of a structure of a G-PCC encoder system 100. As shown in FIG. 1, the G-PCC encoder system 100 includes a coordinate conversion unit 101, a voxelization unit 102, an octree analysis unit 103, a surface approximation analysis unit 104, a geometric reconstruction unit 105, a color conversion unit 106, an attribute transfer unit 107, a RAHT unit 108, a LoD generation unit 109, a lifting unit 110, a coefficient quantization unit 111 and an arithmetic encoding unit 112. The arithmetic encoding unit 112 may implement encoding of header information and quantized coefficients or residuals as CABAC or bypass encoding. First, an input point cloud is preprocessed by the coordinate conversion unit 101, which converts the input point cloud from the world coordinate system to the internal coordinate system, and the voxelization unit 102, which cuts off all points entering bounding edges. The preprocessed point cloud is partitioned into blocks or voxels by the octree analysis unit 103. In this process, an occupancy code is generated, and the occupancy code is encoded by the arithmetic encoding unit 112. The surface approximation analysis unit 104, which is used in a step of TMC1 of a known trisoup, represents geometric information within the blocks by vertices and segind. The geometric reconstruction unit 105 performs reconstruction of geometric information of the point cloud to be used during attribute information. The color transformation unit 106 is an optional unit that coverts a color from an RGB color space into a YUV color space or a YCoCg color space. The reconstructed point cloud is re-colored by the attribute transfer unit 107. The RAHT unit 108 and the LoD generation unit 109 are two typical ways to encode the attribute information. The RAHT unit 108 transforms attribute values into coefficients by wavelet transform. The coefficients are quantized by the coefficient quantization unit 111, and the quantized coefficients are encoded by the arithmetic encoding unit 112. The LoD generation unit 109 transforms points into a plurality of Levels of Detail (LoDs), and predicts attribute values between the LoDs or inside the LoDs to obtain residuals between predicted points and predicted factors. The residuals are quantized by the coefficient quantization unit 111, and the quantized residuals are encoded by the arithmetic encoding unit 112.

Figure 2:
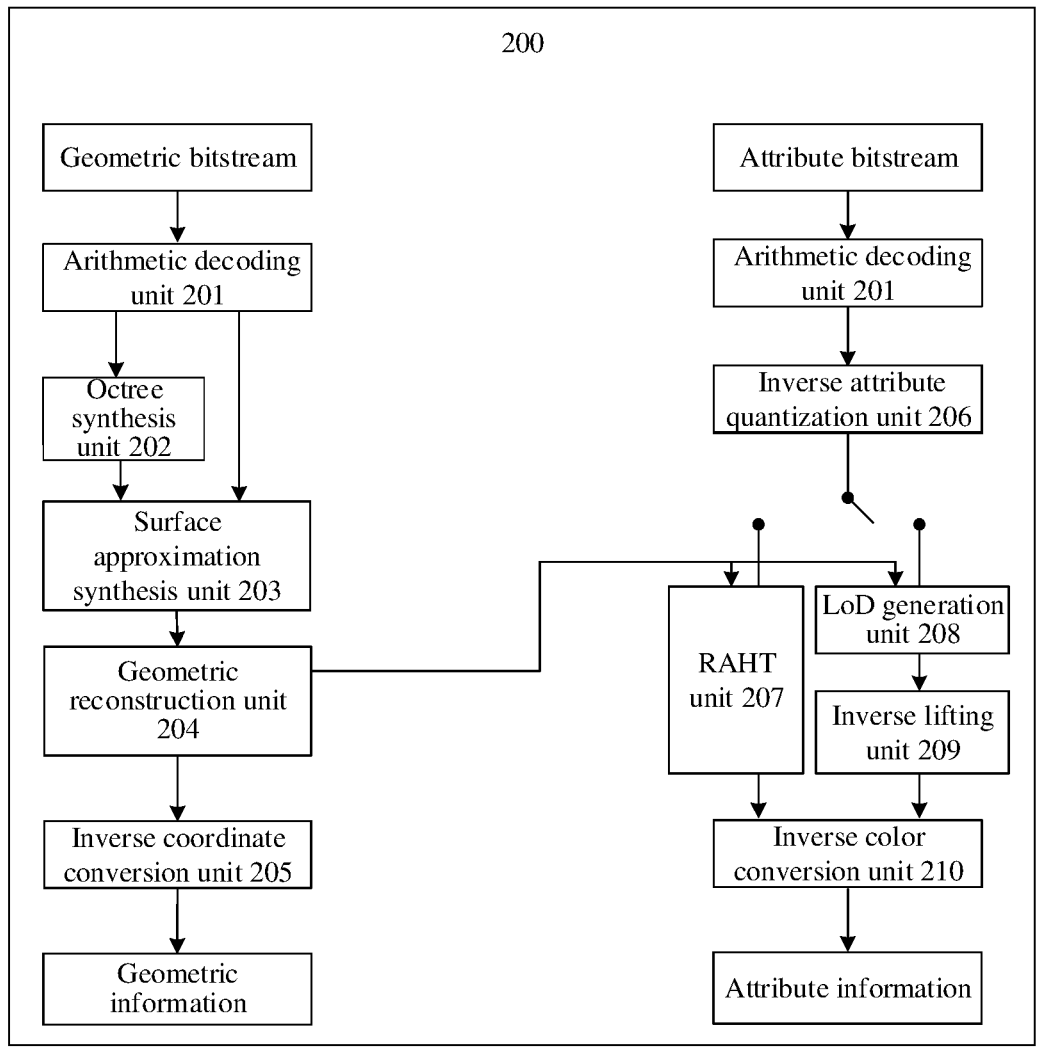
FIG. 2 is a block diagram of a structure of a G-PCC decoder system 200.

FIG. 2 is a block diagram of a structure of a G-PCC decoder system 200. As shown in FIG. 2, the G-PCC decoder system 200 includes an arithmetic decoding Unit 201, an octree synthesis unit 202, a surface approximation synthesis unit 203, a geometric reconstruction unit 204, an inverse coordinate conversion unit 205, an inverse attribute quantization unit 206, a RAHT unit 207, a LoD generation unit 208, an inverse lifting unit 209 and an inverse color conversion unit 210. The arithmetic decoding unit 201 may implement decoding of header information and quantized coefficients or residuals as CABAC or bypass encoding. Geometric bitstream is decoded by the arithmetic decoding unit 201. The octree synthesis unit 202 generates information of blocks or voxels. The surface approximation synthesis unit 203, which is used in a decoding step of TMC 1, reconstructs a surface using triangles and resamples the triangles within the blocks. The geometric reconstruction unit 204 reconstructs geometric information of a point cloud and the inverse coordinate conversion unit 205 converts the reconstructed point cloud from the internal coordinate system into the world coordinate system. Attribute bitstream is decoded by the arithmetic decoding unit 201. Then the quantized coefficients or residuals generated by the arithmetic decoding unit 201 are inversely quantized by the inverse attribute quantization unit 206. According to the encoder, there are also two typical ways to decode the coefficients or residuals. The coefficients are transformed into attribute values by the RAHT unit 207. The residuals are transformed into attribute values by the LoD generation unit 208 and the inverse lifting unit 209. The inverse color conversion unit 210 is an optional unit depending on whether a color space needs to be converted.

A method for constructing a Morton code provided by the present application may be applied to both the G-PCC encoder system 100 and the G-PCC decoder system 200. The flow, framework and algorithm of the method for constructing the Morton code at the encoding end are identical to the flow, framework and algorithm of the method for constructing the Morton code at the decoding end.

The G-PCC encoder system 100 may be a computing device including a processor and a storage medium, and the storage medium records thereon an encoding program including the functions described above. When the processor reads and executes the encoding program, the encoder 100 reads the input point cloud and generates a corresponding bitstream.

The G-PCC encoder system 100 may be a computing device having one or more chips. Units implemented as integrated circuits on the chip and having the above functions have similar functions, similar connections and data exchange to the corresponding units in FIG. 1.

The G-PCC decoder system 200 may be a computing device having a processor and a storage medium, and the storage medium records thereon a decoding program including the functions described above. When the processor reads and executes the decoding program, the decoder 200 reads the input point cloud and generates a corresponding bitstream.

The G-PCC decoder system 200 may be a computing device having one or more chips. Units implemented as integrated circuits on the chip and having the above functions have similar functions, similar connections and data exchange to the corresponding units in FIG. 2.

The technical schemes in the embodiments of the present application will be clearly and completely described below in conjunction with the drawings in the embodiments of the present application.

Figure 3:
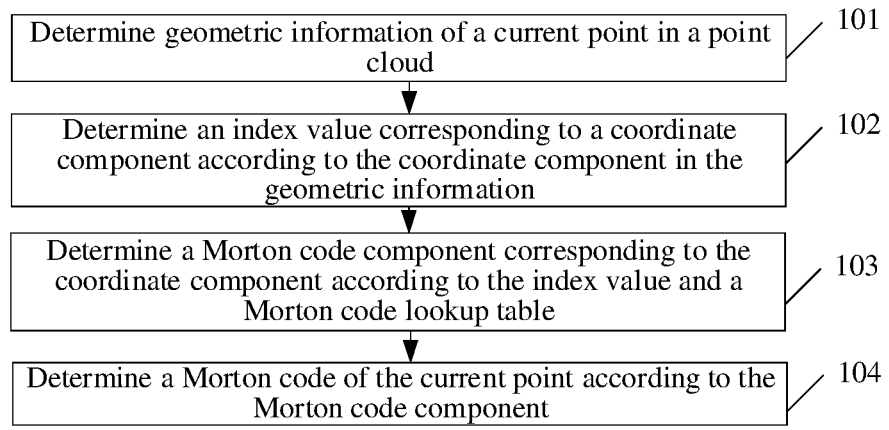
FIG. 3 is a schematic flowchart of a first implementation of a method for constructing a Morton code.

An embodiment of the present application provides a method for constructing a Morton code, which is applied in an encoder. FIG. 3 is a schematic flowchart of a first implementation of the method for constructing the Morton code. As shown in FIG. 3, the method for constructing the Morton code of a point in a point cloud by the encoder may include the following acts.

In act 101, geometric information of a current point in a point cloud is determined.

In the embodiment of the present application, the encoder may first determine the geometric information of the current point in the point cloud.

It should be noted that in the embodiment of the present application, when the point cloud is encoded, the geometric information of the point cloud and attribute information corresponding to the point cloud are encoded separately. After the encoding of the geometric information is completed, the geometric information is reconstructed, and the encoding of the attribute information will depend on the reconstructed geometric information.

Specifically, the encoding of the attribute information is mainly encoding of color information. Firstly, the color information is converted from an RGB color space to a YUV color space. Then, the point cloud is recolored using the reconstructed geometric information, so that the attribute information that is not encoded corresponds to the reconstructed geometric information. Next, the encoding of the point cloud is performed, i.e., the point cloud is first reordered based on the Morton code, to generate a point cloud order used in prediction of the attribute information of the point cloud.

Further, in the embodiment of the present application, after the geometric information of the point cloud is encoded, the encoder may determine a Morton code of each point using the geometric information of each point in the point cloud. After the Morton code of each point is obtained, the encoder may sort all Morton codes of all points in the point cloud in an order from smallest to largest, to generate a point cloud sequence set corresponding to the point cloud. All Morton codes of all points in the point cloud are stored in the point cloud sequence set.

It should be noted that in the embodiment of the present application, when the encoder encodes the attribute information of the point cloud, the encoding of the point cloud may be performed on all points in the point cloud in an order of Morton codes from smallest to largest.

It can be understood that in the embodiment of the present application, the current point may be any point in the point cloud. When the encoding of the point cloud is performed on the current point, the encoding of the point cloud has been performed on other points in the point cloud corresponding to other Morton codes smaller than the Morton code of the current point, and corresponding attribute reconstruction values have been generated.

Further, in the embodiment of the present application, the encoder needs to determine first the Morton code of the current point when performing the encoding of the point cloud on the current point. Specifically, in the present application, the encoder may determine the Morton code of the current point using the geometric information of the current point, so the encoder needs to determine first the geometric information of the current point in the point cloud.

In act 102, an index value corresponding to a coordinate component is determined according to the coordinate component in the geometric information.

In the embodiment of the present application, after the geometric information of the current point in the point cloud is determined, the encoder may further determine each index value corresponding to each coordinate component according to the coordinate component in the geometric information. One coordinate component corresponds to one index value.

It should be noted that in the embodiment of the present application, the index value corresponding to the coordinate component of the current point may be used to search for a Morton code component of the coordinate component.

It can be understood that in the embodiment of the present application, the geometric information corresponding to any point in the point cloud may be constituted by a plurality of coordinate components. Specifically, the coordinate components in the geometric information of the current point may include a first coordinate component, a second coordinate component and a third coordinate component.

Illustratively, in the present application, the geometric information of the current point may be a spatial three-dimensional coordinate (x, y, z) of the current point, i.e., the geometric information of the current point may be expressed as (x, y, z), wherein x is the first coordinate component, y is the second coordinate component, and z is the third coordinate component.

Further, in the present application, when the encoder determines a corresponding index value according to a coordinate component in the geometric information of the current point, it may directly perform binary calculation of the coordinate component and take a binary number of the coordinate component as the corresponding index value.

For example, the geometric information of the current point is (2, 3, 4), that is, the first coordinate component of the current point is 2, the second coordinate component is 3, and the third coordinate component is 4. Then, after binary calculation of each coordinate component of the current point is performed, a first index value corresponding to the first coordinate component may be determined to be 10, a second index value corresponding to the second coordinate component may be determined to be 11, and a third index value corresponding to the third coordinate component may be determined to be 100.

In act 103, a Morton code component corresponding to the coordinate component is determined according to the index value and a Morton code lookup table.

In the embodiment of the present application, after the encoder determines the index value corresponding to the coordinate component according to the coordinate component in the geometric information, the encoder may further look up the Morton code lookup table according to the index value, to finally determine the Morton code component corresponding to the coordinate component.

It can be understood that in the embodiment of the present application, the Morton code lookup table may be used to determine the Morton code component of the current point, i.e., each Morton code component corresponding to each coordinate component of the current point may be obtained through the Morton code lookup table.

Further, in the embodiment of the present application, when the encoder determines the Morton code component corresponding to the coordinate component according to the index value and the Morton code lookup table, the encoder may first determine the Morton code corresponding to the index value based on the Morton code lookup table; then the encoder may further shift the Morton code corresponding to the index value to obtain finally the Morton code component corresponding to the coordinate component.

It should be noted that in the embodiment of the present application, the Morton code corresponding to the index value corresponding to the coordinate component obtained by looking up the Morton code lookup table based on the index value may be in a binary form. Specifically, in the Morton code lookup table, the Morton code corresponding to the index value may be determined after at least one bit of the index value is complemented.

It can be understood that in the embodiment of the present application, for any coordinate component in the geometric information of the current point, the encoder may look up the Morton code lookup table according to the index value of the coordinate component to obtain the Morton code corresponding to the index value corresponding to the coordinate component.

Illustratively, in the present application, Table 2 is a Morton code lookup table. As shown in Table 2, the Morton codes corresponding to different index values may be determined using the Morton code lookup table, and the Morton codes corresponding to the index values may be obtained after at least one bit of the index values is complemented.

TABLE 2

| Index value | Morton code corresponding to index value |
|---|---|
| 0 | 000000000 |
| 01 | 000000001 |
| 10 | 000001000 |
| 11 | 000001001 |
| 100 | 001000000 |
| 101 | 001000001 |
| 111 | 001001001 |

Illustratively, in the present application, if the geometric information of the current point is (2, 3, 4), the first coordinate component of the current point is 2, the second coordinate component is 3, and the third coordinate component is 4. Accordingly, the first index value corresponding to the first coordinate component of the current point is 10, the second index value corresponding to the second coordinate component is 11, and the third index value corresponding to the third coordinate component is 100. The above Table 2 may be looked up according to the first index value, the second index value and the third index value respectively, to obtain a Morton code 000001000 corresponding to the index value corresponding to the first coordinate component, a Morton code 000001001 corresponding to the index value corresponding to the second coordinate component, and a Morton code 001000000 corresponding to the index value corresponding to the third coordinate component.

Further, in the embodiment of the present application, after the encoder obtains the Morton code corresponding to the index value corresponding to each coordinate component based on the Morton code lookup table, the encoder may shift each Morton code component sequentially to finally obtain each Morton code component corresponding to each coordinate component.

It should be noted that in the embodiment of the present application, when the encoder shifts the Morton code corresponding to the index value to obtain the Morton code component corresponding to the coordinate component, the encoder may shift the Morton code corresponding to the index value leftwards by K bits to obtain the shifted Morton code; then determine directly the shifted Morton code to be a Morton code component. In other words, after the Morton code corresponding to the index value is shifted leftwards by K bits, the corresponding Morton code component may be obtained, wherein K is an integer greater than or equal to 0. If K is equal to 0, the shifting will not be performed.

It can be understood that in the embodiment of the present application, for different coordinate components, ways to shift the Morton codes by the encoder may be different. For example, if the Morton code is constructed interleavedly in an order of x, y and z, then for the coordinate component x, the encoder may shift at least one bit of the Morton code corresponding to the index value leftwards by 2 bits; for the coordinate component y, may shift at least one bit of the Morton code corresponding to the index value leftwards by 1 bit; and for the coordinate component z, may not shift the Morton code corresponding to the index value.

It should be noted that in the embodiment of the present application, when the Morton code corresponding to the index value is shifted leftwards by K bits, at least one bit of the Morton code may be chosen to be shifted leftwards, or part of bits of the Morton code may be shifted leftwards, which is not specifically limited in the present application.

For example, if the Morton code is constructed interleavedly in an order of x, y and z and the geometric information of the current point is (2, 3, 4), then 000001000 which is the Morton code mx corresponding to the index value corresponding to the first coordinate component x, 000001001 which is the Morton code my corresponding to the index value corresponding to the second coordinate component y and 001000000 which is the Morton code mz corresponding to the index value corresponding to the third coordinate component z may be obtained by looking up the above Table 2. Then, the encoder may shift mx leftwards by 2 bits to determine the shifted Morton code to be 000100000, i.e., the corresponding Morton code component Mx is determined to be 000100000 (32). The encoder may shift my leftwards by 1 bit to determine the shifted Morton code to be 000010010, i.e., the corresponding Morton code component My is determined to be 000010010 (18). mz remains unchanged, i.e., mz is not shifted, and the corresponding Morton code component Mz is directly determined to be 001000000 (64).

That is to say, in the embodiment of the present application, Morton codes corresponding to index values corresponding to different coordinate components of the current point may be obtained using the same Morton code lookup table, and then the Morton codes corresponding to different index values may be shifted differently according to different coordinate components to finally determine the Morton code component corresponding to each coordinate component.

Illustratively, in the present application, the coordinate components in the geometric information (x, y, z) of the current point include the first coordinate component x, the second coordinate component y, and the third coordinate component z. For the first coordinate component x in the geometric information (x, y, z), the first index value corresponding to the first coordinate component x is determined; the Morton code mx corresponding to the first index value may then be obtained by looking up the Morton code lookup table; next, the Morton code mx corresponding to the first index value may be shifted leftwards by 2 bits, to obtain the first Morton code component Mx corresponding to the first coordinate component x, that is, the shifted Morton code of mx is determined to be the first Morton code component Mx. For the second coordinate component y in the geometric information (x, y, z), the second index value corresponding to the second coordinate component y is determined; then, the Morton code my corresponding to the index value corresponding to the second coordinate component y may be obtained by looking up the Morton code lookup table; next, the Morton code my corresponding to the index value corresponding to the second coordinate component y may be shifted leftwards by 1 bit, to obtain the second Morton code component My corresponding to the second coordinate component y, that is, the shifted Morton code of my is determined to be the second Morton code component My. For the third coordinate component z in the geometric information (x, y, z), the third index value corresponding to the third coordinate component z is determined; then, the Morton code mz corresponding to the index value corresponding to the third coordinate component z may be obtained by looking up the Morton code lookup table; next, the third Morton code component Mz corresponding to the third coordinate component z may be determined directly according to the Morton code mz corresponding to the index value corresponding to the third coordinate component z, that is, mz is determined to be the third Morton code component Mz directly.

It can be seen that in the present application, the encoder may sequentially determine the Morton code components corresponding to different coordinate components of the current point through the same Morton code lookup table, so in the process of determining the Morton codes, the encoder only needs to store and look up one Morton code lookup table, greatly reducing the storage space and the computational complexity.

In act 104, a Morton code of the current point is determined according to the Morton code component.

In the embodiment of the present application, the encoder may further determine the Morton code of the current point according to the Morton code component after searching for the Morton code component corresponding to the coordinate component in the Morton code lookup table according to the index value.

Further, In the embodiment of the present application, since the Morton code component of the current point is in a binary form, after the encoder directly determines the shifted Morton code of each coordinate component to be the corresponding Morton code component, when the encoder determines the Morton code of the current point according to the Morton code components, the encoder may directly perform bitwise AND/OR operation on the Morton code components corresponding to the coordinate components in the geometric information to finally obtain the Morton code of the current point.

It can be understood that in the embodiment of the present application, during performing of the bitwise AND/OR operation, the bitwise AND/OR operation may be performed on each bit of the Morton code components corresponding to the coordinate components, or the bitwise AND/OR operation may be performed on one or more bits of the Morton code components corresponding to the coordinate components.

Illustratively, in the present application, if the shifted Morton code corresponding to the first coordinate component of the current point, i.e., the first Morton code component, is 000100000, the shifted Morton code corresponding to the second coordinate component, i.e., the second Morton code component, is 000010010, and the third Morton code component (without shifting) corresponding to the third coordinate component is 001000000, then the encoder may perform XOR operation on the three Morton code components bit by bit, the obtained binary number is 001110010, and the corresponding Morton code of the current point is 114.

Figure 4:
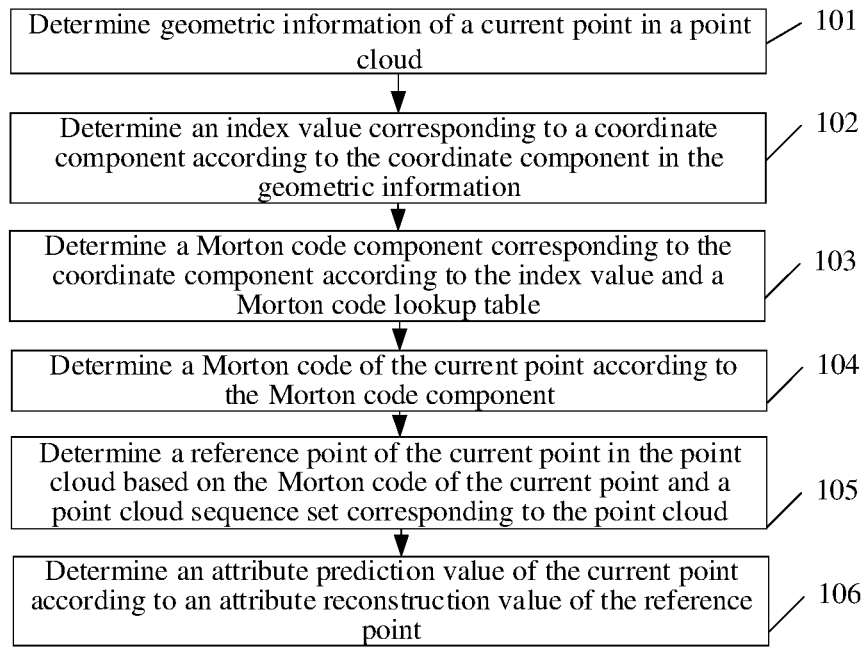
FIG. 4 is a schematic flowchart of a second implementation of a method for constructing a Morton code.

FIG. 4 is a schematic flowchart of a second implementation of the method for constructing the Morton code. As shown in FIG. 4, after the Morton code of the current point is determined according to the Morton code component, that is, after the act 104, the method for constructing the Morton code of the point in the point cloud by the encoder may further include the following act.

In act 105, a reference point of the current point in the point cloud is determined based on the Morton code of the current point and the point cloud sequence set corresponding to the point cloud.

In the embodiment of the present application, after the Morton code of the current point is determined according to the Morton code component, the encoder may further determine the reference point of the current point in the point cloud based on the Morton code of the current point and the point cloud sequence set corresponding to the point cloud.

It should be noted that in the embodiment of the present application, the encoder may obtain all Morton codes of all points in the point cloud according to the method for determining the Morton code proposed in the above acts 101 to 104, and then generate the point cloud sequence set according to all Morton codes corresponding to all points in the point cloud.

It can be understood that in the embodiment of the present application, after the Morton code of each point is obtained, the encoder may sort all Morton codes of all points in an order from smallest to largest to generate the point cloud sequence set corresponding to the point cloud, that is, all Morton codes of all points in the point cloud are stored in the point cloud sequence set in the order from smallest to largest. Therefore, after determining the Morton code of the current point, the encoder may look up the point cloud sequence set using the Morton code of the current point, so as to determine the reference point of the current point in the point cloud.

It should be noted that in the embodiment of the present application, when the encoder looks up the point cloud sequence set based on the Morton code of the current point, the encoder may directly traverse each Morton code in the point cloud sequence set according to the Morton code of the current point to obtain the reference point of the current point, may also look up the point cloud sequence set on the basis of a preset lookup algorithm according to the Morton code of the current point to obtain the reference point of the current point.

That is to say, in the embodiment of the present application, when the encoder looks up the point cloud sequence set based on the Morton code of the current point, not only the way of traversing the point cloud sequence set but also an algorithm of quickly looking up the point cloud sequence set may be used.

In act 106, an attribute prediction value of the current point is determined according to an attribute reconstruction value of the reference point.

In the embodiment of the present application, after the encoder determines the reference point of the current point in the point cloud using the Morton code of the current point and the point cloud sequence set corresponding to the point cloud, the encoder may finally determine the attribute prediction value of the current point according to the attribute reconstruction value of the reference point.

Further, in the embodiment of the present application, after the encoder obtains the reference point of the current point based on the point cloud sequence set, since there is a strong correlation between the current point and the reference point, the attribute prediction value of the current point may be obtained through prediction performed directly by using the attribute reconstruction value of the reference point.

In the embodiment of the present application, further, after the encoder determines the attribute prediction value of the current point according to the attribute reconstruction value of the reference point, the encoder may calculate a prediction residual of the current point according to the attribute prediction value, and then encode the prediction residual to generate a bitstream, and then transmit the bitstream to the decoding end.

It should be noted that in the embodiment of the present application, the encoder may complete the construction of the Morton code of any point in the point cloud by only storing and using one Morton code lookup table in the method for constructing the Morton code proposed in the above acts 101 to 104, thereby not only reducing the storage consumption, but also decreasing the computational complexity without affecting the encoding efficiency.

Specifically, in the present application, for the current point, when the Morton code is constructed interleavedly in an order of xyz, if the coordinate component is the first coordinate component x of the geometric information (x y z) of the current point, the binarized value of x is used as an index for searching for the required corresponding Morton code mx in the Morton code lookup table; if the coordinate component is the second coordinate component y of the geometric information (x y z) of the current point, the binarized value of y is used as an index for searching for the required corresponding Morton code my in the Morton code lookup table; if the coordinate component is the third coordinate component z of the geometric information (x y z) of the current point, the binarized value of z is used as an index for searching for the required corresponding Morton code mz in the Morton code lookup table. Further, after the same Morton code lookup table is looked up using three index values corresponding to three coordinate components to obtain the Morton codes mx, my and mz corresponding to the corresponding index values, at least one bit of mx may be shifted leftwards by two bits to obtain the first Morton code component Mx corresponding to x, my may be shifted leftwards by 1 bit to obtain the second Morton code component My corresponding to y, and mz remains unchanged and is directly set to be the third Morton code component Mz corresponding to z. Finally, the Morton code of the current point is obtained by performing bitwise XOR operation on the first Morton code component Mx, the second Morton code component My and the third Morton code component Mz, i.e., bitwise AND/OR operation is performed on the first Morton code component Mx, the second Morton code component My and the third Morton code component Mz.

It can be understood that in the present application, the method for constructing the Morton code proposed in the above acts 101 to 104 may be applied in the octree geometric encoding (decoding) process, or in the attribute encoding (RAHT) process, or in the attribute encoding (lifting transform) process, which is not specifically limited in the present application.

The embodiment of the present application discloses a method for constructing a Morton code. The encoder determines geometric information of the current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

Based on the embodiments described above, in yet another embodiment of the present application, when the encoder performs the above act 102, that is, when the encoder determines the index values corresponding to the coordinate components according to the coordinate components in the geometric information of the current point, the encoder may also first shift each of the coordinate components of the current point rightwards, and then determine the index value based on the right-shifted component.

Illustratively, in the present application, assuming that the geometric information of the current point is the spatial three-dimensional coordinate (x, y, z) of the current point, the first coordinate component in the geometric information of the current point is x, the second coordinate component is y, and the third coordinate component is z.

Further, in the present application, after determining the geometric information of the current point, when the encoder determines each index value corresponding to each coordinate component sequentially according to each coordinate component in the geometric information, the encoder may first shift the first coordinate component, the second coordinate component and the third coordinate component respectively rightwards by a preset number of bits to obtain the right-shifted first component corresponding to the first coordinate component, the right-shifted second component corresponding to the second coordinate component and the right-shift third component corresponding to the third coordinate component.

It should be noted that in the embodiment of the present application, the first coordinate component, the second coordinate component and the third coordinate component may have the same bit width. For example, a binary bit width of the first coordinate component is 8, a binary bit width of the second coordinate component is 8, and a binary bit width of the third coordinate component is 8.

It can be understood that in the embodiment of the present application, the preset number of bits is used to determine the bit width when the shifting is performed. Specifically, the value of the preset number of bits may be an integer greater than 1.

Illustratively, in the embodiment of the present application, the preset number of bits may be equal to the bit width of the coordinate components, for example, the bit width of the first coordinate component, the second coordinate component, and the third coordinate component is equal to 8, and the preset number of bits is equal to 8. The preset number of bits may also be an integer multiple of the bit width of the coordinate components, for example, the bit width of the first coordinate component, the second coordinate component, and the third coordinate component is equal to 8, and the preset number of bits is equal to 16. The bit width of the coordinate components of the current point and the preset number of bits are not limited specifically in the present application.

Further, in the embodiment of the present application, after binary numbers with the same bit width are shifted by the same number of bits, the obtained new binary numbers also have the same bit width, so the obtained right-shifted first component, right-shifted second component and right-shifted third component also have the same bit width after the first coordinate component, the second coordinate component and the third coordinate component with the same bit width are respectively shifted rightwards by the preset number of bits.

Specifically, in the embodiment of the present application, the bit widths of the right-shifted first component, the right-shifted second component and the right-shifted third component are all (m×n); wherein m and n are integers greater than 1. For example, after the first coordinate component, the second coordinate component and the third coordinate component with the same bit width are respectively shifted rightwards by the preset number of bits, the bit widths of the obtained right-shifted first component, the right-shifted second component and the right-shifted third component are all 24, i.e., (8×3).

Further, in the embodiment of the present application, the encoder may sequentially determine n first index values corresponding to the first coordinate component according to the most significant m-bit, (n−2) intermediate m-bits and the least significant m-bit of the right-shifted first component; and the encoder may sequentially determine n second index values corresponding to the second coordinate component according to the most significant m-bit, (n−2) intermediate m-bits and the least significant m-bit of the right-shifted second component; and the encoder may sequentially determine n third index values corresponding to the third coordinate component according to the most significant m-bit, (n−2) intermediate m-bits and the least significant m-bit of the right-shifted third component.

That is, in the embodiment of the present application, the first index values corresponding to the first coordinate component may include n different index values corresponding sequentially to the most significant m-bit, the (n−2) intermediate m-bits and the least significant m-bit of the right-shifted first component. Accordingly, the second index values corresponding to the second coordinate component may also include n different index values corresponding sequentially to the most significant m-bit, the (n−2) intermediate m-bits and the least significant m-bit of the right-shifted second component. Also accordingly, the third index values corresponding to the third coordinate component may also include n different index values corresponding sequentially to the most significant m-bit, the (n−2) intermediate m-bits and the least significant m-bit of the right-shifted third component.

It can be seen that in the embodiment of the present application, after the encoder shifts each coordinate component of the current point, the encoder may determine a plurality of index values corresponding to each coordinate component according to a fixed number of bits, that is, the encoder may disassemble binary bits of the shifted component according to a fixed bit width interval, to finally generate n different index values corresponding to each coordinate component for n different bit intervals.

Further, in the embodiment of the present application, after determining n index values corresponding to each coordinate component of the current point, the encoder may determine Morton code components corresponding to the coordinate component according to the index values and the Morton code lookup table. Specifically, in the present application, when performing the above act 103, the encoder may determine n first Morton code components corresponding to the first coordinate component, n second Morton code components corresponding to the second coordinate component and n third Morton code components corresponding to the third coordinate component according to n first index values, n second index values, n third index values and the Morton code lookup table.

It can be understood that in the embodiment of the present application, the encoder may determine respectively n index values corresponding to the most significant m-bit, the (n−2) intermediate m-bits and the least significant m-bit of the right-shifted component. Therefore, when the Morton code lookup table is looked up using the index values, the encoder may obtain one first Morton code component corresponding to the most significant m-bit of the right-shifted first component through looking up according to one first index value corresponding to the most significant m-bit of the right-shifted first component. Accordingly, the encoder may obtain one second Morton code component corresponding to the most significant m-bit of the right-shifted second component through looking up according to one second index value corresponding to the most significant m-bit of the right-shifted second component. Also accordingly, the encoder may obtain one third Morton code component corresponding to the most significant m-bit of the right-shifted third component through looking up according to one third index value corresponding to the most significant m-bit of the right-shifted third component.

It should be noted that in the present application, after traversing the n index values corresponding to the most significant m-bit, the (n−2) intermediate m-bits and the least significant m-bit of the right-shifted component of each coordinate component, the encoder may obtain n Morton code components corresponding to the most significant m-bit, the (n−2) intermediate m-bits and the least significant m-bit of the right-shifted component of each coordinate component.

Further, in the embodiment of the present application, after the encoder determines the n first Morton code components, the n second Morton code components and the n third Morton code components according to the n first index values, the n second index values, the n third index values and the Morton code lookup table, the encoder may further determine the Morton code of the current point according to the n Morton code components corresponding to each coordinate component.

Specifically, in the embodiment of the present application, when the encoder performs the above act 104, that is, when the encoder determines the Morton code of the current point according to the Morton code components, the encoder may first determine n interval Morton codes of the current point according to the n first Morton code components, the n second Morton code components and the n third Morton code components; and then determine the Morton code of the current point according to the n interval Morton codes.

It can be understood that in the embodiment of the present application, since the encoder determines the n index values based on the right-shifted components, when the n Morton code components are processed subsequently after the n Morton code components are acquired by looking up the Morton code lookup table according to the n index values, the encoder further needs to perform left shift processing accordingly.

Specifically, in the embodiment of the present application, the specific number of bits by which the encoder performs left shift processing is related to the number of bits by which the encoder performs the above right shift processing and the corresponding bit width interval.

Illustratively, in the embodiment of the present application, assuming that the binary bit width of the first coordinate component is 8, the binary bit width of the second coordinate component is 8, and the binary bit width of the third coordinate component is 8, the preset number of bits of the right shift processing is 16. Then, after the geometric information (x, y, z) of the current point is determined, the encoder may shift each coordinate component in the geometric information rightwards by the preset number of bits, that is, shift the binary number of the first coordinate component x, the binary number of the second coordinate component y and the binary number of the third coordinate component z respectively rightwards by 16 bits, so as to obtain the right-shifted first component corresponding to the first coordinate component x, the right-shifted second component corresponding to the second coordinate component y and the right-shifted third component corresponding to the third coordinate component z.

It can be understood that in the present application, after the right shift processing is performed, the bit widths of the right-shifted first component corresponding to x, the right-shifted second component corresponding to y and the right-shift third component corresponding to z are all 24, in this case it may be considered that m is 8 and n is 3.

Further, in the embodiment of the present application, the encoder may determine one first index value corresponding to the first coordinate component x according to the most significant 8-bit of the right-shifted first component, and then look up the Morton code lookup table using the first index value to obtain one first Morton code component corresponding to the most significant 8-bit of the right-shifted first component.

Specifically, in the present application, the encoder may first look up the Morton code lookup table using the first index value to obtain one Morton code mx corresponding to the corresponding index value, and then shift the Morton code mx corresponding to the index value leftwards by 2 bits to obtain one first Morton code component Mx, corresponding to the first index value, of the first coordinate component x.

Accordingly, in the present application, the encoder may also determine one second index value corresponding to the second coordinate component y according to the most significant 8-bit of the right-shifted second component, and then look up the Morton code lookup table using the second index value to obtain one second Morton code component corresponding to the most significant 8-bit of the right-shifted second component.

Specifically, in the present application, the encoder may first look up the Morton code lookup table using the second index value to obtain one Morton code my corresponding to the corresponding index value, and then shift the Morton code my corresponding to the index value leftwards by 1 bit to obtain one second Morton code component My, corresponding to the second index value, of the second coordinate component y.

Accordingly, in the present application, the encoder may also determine one third index value corresponding to the third coordinate component z according to the most significant 8-bit of the right-shifted third component, and then look up the Morton code lookup table using the third index value to obtain one third Morton code component corresponding to the most significant 8-bit of the right-shifted third component.

Specifically, in the present application, the encoder may first look up the Morton code lookup table using the third index value to obtain one Morton code mz corresponding to the corresponding index value, and then directly generate one third Morton code component Mz, corresponding to the third index value, of the third coordinate component z according to the Morton code mz corresponding to the index value.

Further, in an embodiment of the present application, after one first Morton code component, one second Morton code component and one third Morton code component corresponding to a bit width interval of the most significant 8-bit are determined, the encoder may further generate one interval Morton code corresponding to the bit width interval of the most significant 8-bit according the three Morton code components.

It should be noted that in the present application, before the three index values of the three coordinate components corresponding to the bit width interval of the most significant 8-bit are generated, the three coordinate components are shifted rightwards by 16 bits respectively, so corresponding left shift processing needs to be performed when the interval Morton code is generated.

Specifically, in the embodiment of the present application, the encoder may perform bit interleaving on the three coordinate components corresponding to the bit width interval of the most significant 8-bit in an order of x, y and z to obtain an interleaved binary number, a bit width of which is 24, and then shift the interleaved binary number leftwards by 48, i.e., (16×3) bits, to obtain an interval Morton code corresponding to the bit width interval of the most significant 8-bit.

Further, in the embodiment of the present application, the encoder may also continue to determine three index values of the three coordinate components corresponding to a bit width interval of (3-2) intermediate 8-bit in the manner described above, then obtain three Morton code components corresponding to the bit width interval of intermediate 8-bit based on the Morton code lookup table, and finally obtain an interval Morton code corresponding to the bit width interval of intermediate 8-bit using the three Morton code components.

Specifically, in the embodiment of the present application, the encoder may perform bit interleaving on the three coordinate components corresponding to the bit width interval of intermediate 8-bit in an order of x, y and z to obtain an interleaved binary number, a bit width of which is 24, and then shift the interleaved binary number leftwards by 24 bits (8×3) to obtain an interval Morton code corresponding to the bit width interval of intermediate 8-bit.

Further, in the embodiment of the present application, the encoder may also continue to determine three index values of the three coordinate components corresponding to a bit width interval of the least significant 8-bit in the manner described above, then obtain three Morton code components corresponding to the bit width interval of the least significant 8-bit based on the Morton code lookup table, and finally obtain an interval Morton code corresponding to the bit width interval of the least significant 8-bit using the three Morton code components.

Specifically, in the embodiment of the present application, the encoder may perform bit interleaving on the three coordinate components corresponding to the bit width interval of the least significant 8-bit in an order of x, y and z to obtain an interleaved binary number, a bit width of which is 24, and then determine directly the interleaved binary number to be an interval Morton code corresponding to the bit width interval of the least significant 8-bit.

It can be understood that in the embodiment of the present application, after the encoder determines three interval Morton codes corresponding to all the three bit width intervals constituting 24 bits, the encoder may perform bitwise XOR operation on the three interval Morton codes and determine the value obtained through the XOR operation to be the Morton code of the current point.

An example of implementation of the above method will be illustrated below in C/C++ programming language.

```
inline int64_t
mortonAddr (const int32_t x, const int32_t y, const int32_t z)
{
    assert (x>= 0&& >=0&&z>=0);
    int64_t mortonCode = (kMortonCode256[(x>>16)&0xFF]<<2)
        |(kMortonCode256[(y>>16)&0xFF] <1)
        |KMortonCode 256[(z>>16)&0xFF];
    mortonCode =
    mortonCode<<24|(kMortonCode256[(x>>8)&0xFF]<<2)
        |(kMortonCode256[(y>>8)&0xFF]<<1)
        |kMortonCode256[(z>>8)&0xFF];
    mortonCode = mortonCode<<24|(kMortonCode256[x&0xFF]<<2)
        |(kMortonCode256[y&0xFF]<<1)
        |kMortonCode256[z&0xFF];
    return mortonCode;
}
```

Herein int64_t represents a data type of a 64-bit integer; int32_t represents a data type of a 32-bit integer; (x, y, z) is an input coordinate of a certain point in a point cloud, that is, the geometric information; kMortonCode256[ ] is a unique lookup table used when the Morton code is acquired, that is, the Morton code lookup table; and variable mortonCode is a Morton code of the input coordinate (x, y, z) of the point.

It can be understood that in the embodiment of the present application, the bit widths corresponding to the first coordinate component, the second coordinate component and the third coordinate component of the current point may be any integer greater than 0, which is not specifically limited in the present application.

It can be understood that in the embodiment of the present application, the preset number of bits by which the encoder performs right shift processing may be any integer greater than 0, which is not specifically limited in the present application.

It can be understood that in the embodiment of the present application, the bit width of the right-shifted coordinate component is (m×n) and may be disassembled into n bit width intervals of m-bit, wherein m and n may be integers greater than 1, which is not specifically limited in the present application.

The embodiment of the present application discloses a method for constructing a Morton code. The encoder determines geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

Figure 5:
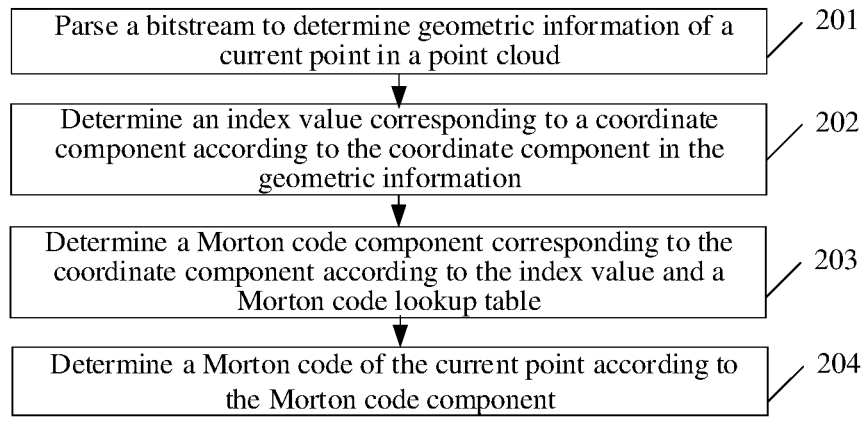
FIG. 5 is a schematic flowchart of a third implementation of a method for constructing a Morton code.

An embodiment of the present application provides a method for constructing a Morton code, which is applied in a decoder. FIG. 5 is a schematic flowchart of a third implementation of a method for constructing a Morton code. As shown in FIG. 5, the method for constructing the Morton code of a point in a point cloud by the decoder may include the following acts.

In act 201, a bitstream is parsed to determine geometric information of a current point in a point cloud.

In the embodiment of the present application, the decoder may first parse the bitstream to determine the geometric information of the current point in the point cloud.

It should be noted that in the embodiment of the present application, when the point cloud is decoded, geometric information of the point cloud and attribute information corresponding to the point cloud are decoded separately. After the decoding of the geometric information is completed, the geometric information is reconstructed, and the decoding of the attribute information will depend on the reconstructed geometric information.

Specifically, the decoding of the attribute information is mainly decoding of color information. Firstly, the color information is converted from an RGB color space to a YUV color space. Then, the point cloud is recolored using the reconstructed geometric information, so that the attribute information that is not decoded corresponds to the reconstructed geometric information. Next, decoding of the point cloud is performed, during the decoding of the point cloud, the point cloud is first reordered based on the Morton code, and a point cloud order used in prediction of the attribute information of the point cloud is generated.

Further, in the embodiment of the present application, after the geometric information of the point cloud is decoded, the decoder may determine a Morton code of each point using the geometric information of each point in the point cloud. After the Morton code of each point is obtained, the decoder may sort all Morton codes of all points in the point cloud in an order from smallest to largest, and generate a point cloud sequence set corresponding to the point cloud. All Morton codes of all points in the point cloud are stored in the point cloud sequence set.

It should be noted that in the embodiment of the present application, when the decoder decodes the attribute information of the point cloud, the decoding of the point cloud may be performed on all points in the point cloud in the order of Morton codes from smallest to largest.

It can be understood that in the embodiment of the present application, the current point may be any point in the point cloud. When the decoding of the point cloud is performed on the current point, the decoding of the point cloud has been performed on other points in the point cloud corresponding to other Morton codes smaller than the Morton code of the current point, and corresponding attribute reconstruction values have been generated.

Further, in the embodiment of the present application, the decoder needs to determine first the Morton code of the current point when performing the decoding of the point cloud on the current point. Specifically, in the present application, the decoder may determine the Morton code of the current point using the geometric information of the current point, so the decoder needs to determine first the geometric information of the current point in the point cloud.

In act 202, an index value corresponding to a coordinate component is determined according to the coordinate component in the geometric information.

In the embodiment of the present application, after the geometric information of the current point in the point cloud is determined, the decoder may further determine each index value corresponding to each coordinate component according to the coordinate component in the geometric information. One coordinate component corresponds to one index value.

It should be noted that in the embodiment of the present application, the index value corresponding to the coordinate component of the current point may be used to search for a Morton code component of the coordinate component.

It can be understood that in the embodiment of the present application, the geometric information corresponding to any point in the point cloud may be constituted by a plurality of coordinate components. Specifically, the coordinate components in the geometric information of the current point may include a first coordinate component, a second coordinate component and a third coordinate component.

Illustratively, in the present application, the geometric information of the current point may be a spatial three-dimensional coordinate (x, y, z) of the current point, i.e., the geometric information of the current point may be expressed as (x, y, z), wherein x is the first coordinate component, y is the second coordinate component, and z is the third coordinate component.

Further, in the present application, when the decoder determines a corresponding index value according to a coordinate component in the geometric information of the current point, it may directly perform binary calculation of the coordinate component and take a binary number of the coordinate component as the corresponding index value.

For example, the geometric information of the current point is (2, 3, 4), that is, the first coordinate component of the current point is 2, the second coordinate component is 3, and the third coordinate component is 4. Then, after binary calculation of each coordinate component of the current point is performed, a first index value corresponding to the first coordinate component may be determined to be 10, a second index value corresponding to the second coordinate component may be determined to be 11, and a third index value corresponding to the third coordinate component may be determined to be 100.

In act 203, a Morton code component corresponding to the coordinate component is determined according to the index value and a Morton code lookup table.

In the embodiment of the present application, after the decoder determines the index value corresponding to the coordinate component according to the coordinate component in the geometric information, the decoder may further look up the Morton code lookup table according to the index value, to finally determine the Morton code component corresponding to the coordinate component.

It can be understood that in the embodiment of the present application, the Morton code lookup table may be used to determine the Morton code component of the current point, i.e., each Morton code component corresponding to each coordinate component of the current point may be obtained through the Morton code lookup table.

Further, in the embodiment of the present application, when the decoder determines the Morton code component corresponding to the coordinate component according to the index value and the Morton code lookup table, the decoder may first determine the Morton code corresponding to the index value based on the Morton code lookup table; then the decoder may further shift the Morton code corresponding to the index value to obtain finally the Morton code component corresponding to the coordinate component.

It should be noted that in the embodiment of the present application, the Morton code corresponding to the index value corresponding to the coordinate component obtained by looking up the Morton code lookup table based on the index value may be in a binary form. Specifically, in the Morton code lookup table, the Morton code corresponding to the index value may be determined after at least one bit of the index value is complemented.

It can be understood that in the embodiment of the present application, for any coordinate component in the geometric information of the current point, the decoder may look up the Morton code lookup table according to the index value of the coordinate component to obtain the Morton code corresponding to the index value corresponding to the coordinate component.

Illustratively, in the present application, Table 2 is a Morton code lookup table. As shown in Table 2, the Morton codes corresponding to different index values may be determined using the Morton code lookup table, and the Morton codes corresponding to the index values may be obtained after at least one bit of the index values is complemented.

Illustratively, in the present application, if the geometric information of the current point is (2, 3, 4), the first coordinate component of the current point is 2, the second coordinate component is 3, and the third coordinate component is 4. Accordingly, a first index value corresponding to the first coordinate component of the current point is 10, a second index value corresponding to the second coordinate component is 11, and a third index value corresponding to the third coordinate component is 100. The above Table 2 may be looked up according to the first index value, the second index value and the third index value respectively, to obtain a Morton code 000001000 corresponding to the index value corresponding to the first coordinate component, a Morton code 000001001 corresponding to the index value corresponding to the second coordinate component, and a Morton code 001000000 corresponding to the index value corresponding to the third coordinate component.

Further, in the embodiment of the present application, after the decoder obtains the Morton code corresponding to the index value corresponding to each coordinate component based on the Morton code lookup table, the decoder may shift each Morton code component sequentially to finally obtain each Morton code component corresponding to each coordinate component.

It should be noted that in the embodiment of the present application, when the decoder shifts the Morton code corresponding to the index value to obtain the Morton code component corresponding to the coordinate component, the decoder may shift the Morton code corresponding to the index value leftwards by K bits to obtain the shifted Morton code; then determine directly the shifted Morton code to be a Morton code component. In other words, after the Morton code corresponding to the index value is shifted leftwards by K bits, the corresponding Morton code component may be obtained, wherein K is an integer greater than or equal to 0. If K is equal to 0, the shifting will not be performed.

It can be understood that in the embodiment of the present application, for different coordinate components, ways to shift the Morton codes by the decoder may be different. For example, if the Morton code is constructed interleavedly in an order of x, y and z, then for the coordinate component x, the decoder may shift at least one bit of the Morton code corresponding to the index value leftwards by 2 bits; for the coordinate component y, may shift at least one bit of the Morton code corresponding to the index value leftwards by 1 bit; and for the coordinate component z, may not shift the Morton code corresponding to the index value.

It should be noted that in the embodiment of the present application, when the Morton code corresponding to the index value is shifted leftwards by K bits, at least one bit of the Morton code may be chosen to be shifted leftwards, or part of bits of the Morton code may be shifted leftwards, which is not specifically limited in the present application.

For example, if the Morton code is constructed interleavedly in an order of x, y and z and the geometric information of the current point is (2, 3, 4), then 000001000 which is the Morton code mx corresponding to the index value corresponding to the first coordinate component x, 000001001 which is the Morton code my corresponding to the index value corresponding to the second coordinate component y, and 001000000 which is the Morton code mz corresponding to the index value corresponding to the third coordinate component z may be obtained by looking up the above Table 2. Then, the decoder may shift mx leftwards by 2 bits to determine the shifted Morton code to be 000100000, i.e., the corresponding Morton code component Mx is determined to be 000100000 (32). The decoder may shift my leftwards by 1 bit to determine the shifted Morton code to be 000010010, i.e., the corresponding Morton code component My is determined to be 000010010 (18). mz remains unchanged, i.e., mz is not shifted, and the corresponding Morton code component Mz is directly determined to be 001000000 (64).

That is to say, in the embodiment of the present application, Morton codes corresponding to index values corresponding to different coordinate components of the current point may be obtained using the same Morton code lookup table, and then the Morton codes corresponding to different index values may be shifted differently according to different coordinate components to finally determine the Morton code component corresponding to each coordinate component.

Illustratively, in the present application, the coordinate components in the geometric information (x, y, z) of the current point include the first coordinate component x, the second coordinate component y, and the third coordinate component z. For the first coordinate component x in the geometric information (x, y, z), the first index value corresponding to the first coordinate component x is determined; the Morton code mx corresponding to the first index value may then be obtained by looking up the Morton code lookup table; next, the Morton code mx corresponding to the first index value may be shifted leftwards by 2 bits, to obtain the first Morton code component Mx corresponding to the first coordinate component x, that is, the shifted Morton code of mx is determined to be the first Morton code component Mx. For the second coordinate component y in the geometric information (x, y, z), the second index value corresponding to the second coordinate component y is determined; then, the Morton code my corresponding to the index value corresponding to the second coordinate component y may be obtained by looking up the Morton code lookup table; next, the Morton code my corresponding to the index value corresponding to the second coordinate component y may be shifted leftwards by 1 bit, to obtain the second Morton code component My corresponding to the second coordinate component y, that is, the shifted Morton code of my is determined to be the second Morton code component My. For the third coordinate component z in the geometric information (x, y, z), the third index value corresponding to the third coordinate component z is determined; then, the Morton code mz corresponding to the index value corresponding to the third coordinate component z may be obtained by looking up the Morton code lookup table; next, the third Morton code component Mz corresponding to the third coordinate component z may be determined directly according to the Morton code mz corresponding to the index value corresponding to the third coordinate component z, that is, mz is determined to be the third Morton code component Mz directly.

It can be seen that in the present application, the decoder may sequentially determine the Morton code components corresponding to different coordinate components of the current point through the same Morton code lookup table, so in the process of determining the Morton codes, the decoder only needs to store and look up one Morton code lookup table, greatly reducing the storage space and the complexity of calculation.

In act 204, a Morton code of the current point is determined according to the Morton code component.

In the embodiment of the present application, the decoder may further determine the Morton code of the current point according to the Morton code component after searching for the Morton code component corresponding to the coordinate component in the Morton code lookup table according to the index value.

Further, in the embodiment of the present application, since all Morton code components of the current point are in a binary form, after the decoder directly determines the shifted Morton code of each coordinate component to be the corresponding Morton code component, when the decoder determines the Morton code of the current point according to the Morton code components, the decoder may directly perform bitwise AND/OR operation on the Morton code components corresponding to the coordinate components in the geometric information to finally obtain the Morton code of the current point.

It can be understood that in the embodiment of the present application, during performing of the bitwise AND/OR operation, the bitwise AND/OR operation may be performed on each bit of the Morton code components corresponding to the coordinate components, or the bitwise AND/OR operation may be performed on one or more bits of the Morton code components corresponding to the coordinate components.

Illustratively, in the present application, if the shifted Morton code corresponding to the first coordinate component of the current point, i.e., the first Morton code component, is 000100000, the shifted Morton code corresponding to the second coordinate component, i.e., the second Morton code component, is 000010010, and the third Morton code component (without shifting) corresponding to the third coordinate component is 001000000, then the decoder may perform XOR operation on the three Morton code components bit by bit, the obtained binary number is 001110010, and the corresponding Morton code of the current point is 114.

Figure 6:
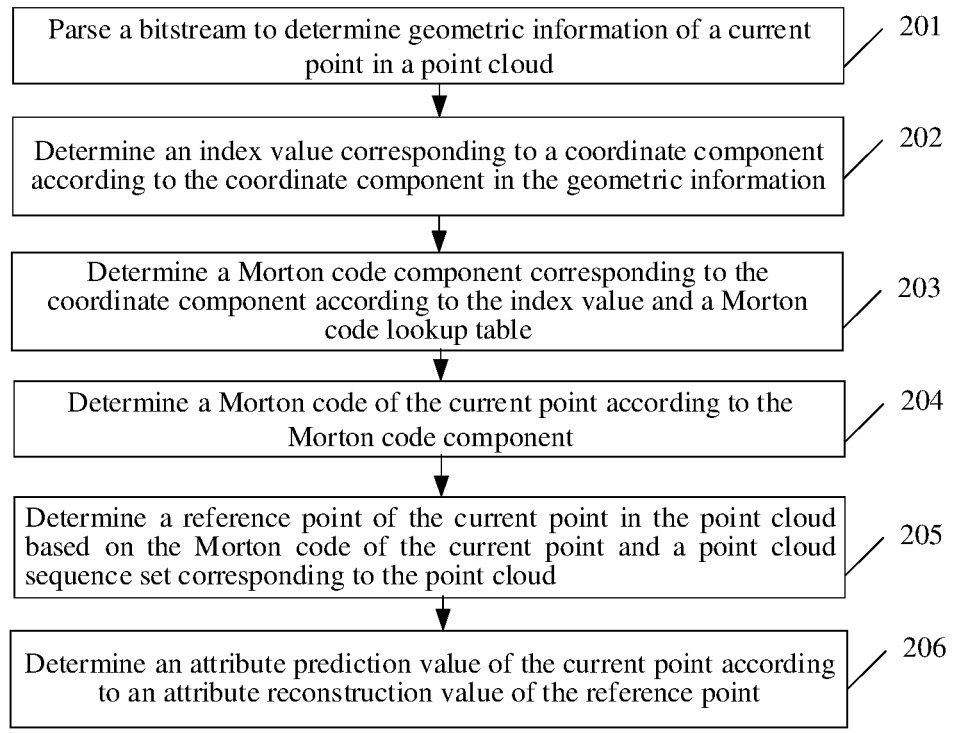
FIG. 6 is a schematic flowchart of a fourth implementation of a method for constructing a Morton code.

FIG. 6 is a schematic flowchart of a fourth implementation of the method for constructing the Morton code. As shown in FIG. 6, after the Morton code of the current point is determined according to the Morton code component, that is, after the act 104, the method for constructing the Morton code of the point in the point cloud by the decoder may further include the following acts.

In act 205, a reference point of the current point in the point cloud is determined based on the Morton code of the current point and the point cloud sequence set corresponding to the point cloud.

In the embodiment of the present application, after the Morton code of the current point is determined according to the Morton code component, the decoder may further determine the reference point of the current point in the point cloud based on the Morton code of the current point and the point cloud sequence set corresponding to the point cloud.

It should be noted that in the embodiment of the present application, the decoder may obtain all Morton codes of all points in the point cloud according to the method for determining the Morton code proposed in the above acts 201 to 204, and then generate the point cloud sequence set according to all Morton codes corresponding to all points in the point cloud.

It can be understood that in the embodiment of the present application, after the Morton code of each point is obtained, the decoder may sort all Morton codes of all points in an order from smallest to largest to generate the point cloud sequence set corresponding to the point cloud, that is, all Morton codes of all points in the point cloud are stored in the point cloud sequence set in the order from smallest to largest. Therefore, after determining the Morton code of the current point, the decoder may look up the point cloud sequence set using the Morton code of the current point, so as to determine the reference point of the current point in the point cloud.

It should be noted that in the embodiment of the present application, when the decoder looks up the point cloud sequence set based on the Morton code of the current point, the decoder may directly traverse each Morton code in the point cloud sequence set according to the Morton code of the current point to obtain the reference point of the current point, may also look up the point cloud sequence set on the basis of a preset lookup algorithm according to the Morton code of the current point to obtain the reference point of the current point.

That is to say, in the embodiment of the present application, when the decoder looks up the point cloud sequence set based on the Morton code of the current point, not only the way of traversing the point cloud sequence set but also an algorithm of quickly looking up the point cloud sequence set may be used.

In act 206, an attribute prediction value of the current point is determined according to an attribute reconstruction value of the reference point.

In the embodiment of the present application, after the decoder determines the reference point of the current point in the point cloud using the Morton code of the current point and the point cloud sequence set corresponding to the point cloud, the decoder may finally determine the attribute prediction value of the current point according to the attribute reconstruction value of the reference point.

Further, in the embodiment of the present application, after the decoder obtains the reference point of the current point based on the point cloud sequence set, since there is a strong correlation between the current point and the reference point, the attribute prediction value of the current point may be obtained through prediction performed directly by using the attribute reconstruction value of the reference point.

In the embodiment of the present application, further, the decoder may also determine a prediction residual of the current point by parsing the bitstream, and then determine a reconstruction value of the current point according to the attribute prediction value and the prediction residual.

It should be noted that in the embodiment of the present application, the decoder may complete the construction of the Morton code of any point in the point cloud by only storing and using one Morton code lookup table through the method for constructing the Morton code proposed in the above acts 201 to 204, thereby not only reducing the storage consumption, but also decreasing the computational complexity without affecting the decoding efficiency.

Specifically, in the present application, for the current point, when the Morton code is constructed interleavedly in an order of xyz, if the coordinate component is the first coordinate component x of the geometric information (x y z) of the current point, the binarized value of x is used as an index for searching for the required corresponding Morton code mx in the Morton code lookup table; if the coordinate component is the second coordinate component y of the geometric information (x y z) of the current point, the binarized value of y is used as an index for searching for the required corresponding Morton code my in the Morton code lookup table; if the coordinate component is the third coordinate component z of the geometric information (x y z) of the current point, the binarized value of z is used as an index for searching for the required corresponding Morton code mz in the Morton code lookup table. Further, after the same Morton code lookup table is looked up using three index values corresponding to three coordinate components to obtain the Morton codes mx, my and mz corresponding to the corresponding index values, at least one bit of mx may be shifted leftwards by two bits to obtain the first Morton code component Mx corresponding to x, my may be shifted leftwards by 1 bit to obtain the second Morton code component My corresponding to y, and mz remains unchanged and is directly set to be the third Morton code component Mz corresponding to z. Finally, the Morton code of the current point is obtained by performing bitwise XOR operation on the first Morton code component Mx, the second Morton code component My and the third Morton code component Mz, i.e., bitwise AND/OR operation is performed on the first Morton code component Mx, the second Morton code component My and the third Morton code component Mz.

It can be understood that in the present application, the method for constructing the Morton code proposed in the above acts 201 to 204 may be applied in the octree geometric encoding (decoding) process, or in the attribute encoding (RAHT) process, or in the attribute encoding (lifting transform) process, which is not specifically limited in the present application.

The embodiment of the present application discloses a method for constructing a Morton code. The decoder parses a bitstream to determine geometric information of the current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

Based on the embodiments described above, in yet another embodiment of the present application, when the decoder performs the above act 202, that is, when the decoder determines the index values corresponding to the coordinate components according to the coordinate components in the geometric information of the current point, the decoder may also first shift each of the coordinate components of the current point rightwards, and then determine the index value based on the right-shifted component.

Illustratively, in the present application, assuming that the geometric information of the current point is the spatial three-dimensional coordinate (x, y, z) of the current point, the first coordinate component in the geometric information of the current point is x, the second coordinate component is y, and the third coordinate component is z.

Further, in the present application, after determining the geometric information of the current point, when the decoder determines each index value corresponding to each coordinate component sequentially according to each coordinate component in the geometric information, the decoder may first shift the first coordinate component, the second coordinate component and the third coordinate component respectively rightwards by a preset number of bits to obtain the right-shifted first component corresponding to the first coordinate component, the right-shifted second component corresponding to the second coordinate component and the right-shift third component corresponding to the third coordinate component.

It should be noted that in the embodiment of the present application, the first coordinate component, the second coordinate component and the third coordinate component may have the same bit width. For example, a binary bit width of the first coordinate component is 8, a binary bit width of the second coordinate component is 8, and a binary bit width of the third coordinate component is 8.

It can be understood that in the embodiment of the present application, the preset number of bits is used to determine the bit width when the shifting is performed. Specifically, the value of the preset number of bits may be an integer greater than 1.

Illustratively, in the embodiment of the present application, the preset number of bits may be equal to the bit width of the coordinate components, for example, the bit width of the first coordinate component, the second coordinate component, and the third coordinate component is equal to 8, and the preset number of bits is equal to 8. The preset number of bits may also be an integer multiple of the bit width of the coordinate components, for example, the bit width of the first coordinate component, the second coordinate component, and the third coordinate component is equal to 8, and the preset number of bits is equal to 16. The bit width of the coordinate components of the current point and the preset number of bits are not limited specifically in the present application.

Further, in the embodiment of the present application, after binary numbers with the same bit width are shifted by the same number of bits, the obtained new binary numbers also have the same bit width, so the obtained right-shifted first component, right-shifted second component and right-shifted third component also have the same bit width after the first coordinate component, the second coordinate component and the third coordinate component with the same bit width are respectively shifted rightwards by the preset number of bits.

Specifically, in the embodiment of the present application, the bit widths of the right-shifted first component, the right-shifted second component and the right-shifted third component are all (m×n); wherein m and n are integers greater than 1. For example, after the first coordinate component, the second coordinate component and the third coordinate component with the same bit width are respectively shifted rightwards by the preset number of bits, the bit widths of the obtained right-shifted first component, the right-shifted second component and the right-shifted third component are all 24, i.e., (8×3).

Further, in the embodiment of the present application, the decoder may sequentially determine n first index values corresponding to the first coordinate component according to the most significant m-bit, (n−2) intermediate m-bits and the least significant m-bit of the right-shifted first component; and the decoder may sequentially determine n second index values corresponding to the second coordinate component according to the most significant m-bit, (n−2) intermediate m-bits and the least significant m-bit of the right-shifted second component; and the decoder may sequentially determine n third index values corresponding to the third coordinate component according to the most significant m-bit, (n−2) intermediate m-bits and the least significant m-bit of the right-shifted third component.

That is, in the embodiment of the present application, the first index values corresponding to the first coordinate component may include n different index values corresponding sequentially to the most significant m-bit, the (n−2) intermediate m-bits and the least significant m-bit of the right-shifted first component. Accordingly, the second index values corresponding to the second coordinate component may also include n different index values corresponding sequentially to the most significant m-bit, the (n−2) intermediate m-bits and the least significant m-bit of the right-shifted second component. Also accordingly, the third index values corresponding to the third coordinate component may also include n different index values corresponding sequentially to the most significant m-bit, the (n−2) intermediate m-bits and the least significant m-bit of the right-shifted third component.

It can be seen that in the embodiment of the present application, after the decoder shifts each coordinate component of the current point, the decoder may determine a plurality of index values corresponding to each coordinate component according to a fixed number of bits, that is, the decoder may disassemble binary bits of the shifted component according to a fixed bit width interval, to finally generate n different index values corresponding to each coordinate component for n different bit intervals.

Further, in the embodiment of the present application, after determining n index values corresponding to each coordinate component of the current point, the decoder may determine Morton code components corresponding to the coordinate component according to the index values and the Morton code lookup table. Specifically, in the present application, when performing the above act 203, the decoder may determine n first Morton code components corresponding to the first coordinate component, n second Morton code components corresponding to the second coordinate component and n third Morton code components corresponding to the third coordinate component according to n first index values, n second index values, n third index values and the Morton code lookup table.

It can be understood that in the embodiment of the present application, the decoder may determine respectively n index values corresponding to the most significant m-bit, the (n−2) intermediate m-bits and the least significant m-bit of the right-shifted component. Therefore, when the Morton code lookup table is looked up using the index values, the decoder may obtain one first Morton code component corresponding to the most significant m-bit of the right-shifted first component through looking up according to one first index value corresponding to the most significant m-bit of the right-shifted first component. Accordingly, the decoder may obtain one second Morton code component corresponding to the most significant m-bit of the right-shifted second component through looking up according to one second index value corresponding to the most significant m-bit of the right-shifted second component. Also accordingly, the decoder may obtain one third Morton code component corresponding to the most significant m-bit of the right-shifted third component through looking up according to one third index value corresponding to the most significant m-bit of the right-shifted third component.

It should be noted that in the present application, after traversing the n index values corresponding to the most significant m-bit, the (n−2) intermediate m-bits and the least significant m-bit of the right-shifted component of each coordinate component, the decoder may obtain n Morton code components corresponding to the most significant m-bit, the (n−2) intermediate m-bits and the least significant m-bit of the right-shifted component of each coordinate component.

Further, in the embodiment of the present application, after the decoder determines the n first Morton code components, the n second Morton code components and the n third Morton code components according to the n first index values, the n second index values, the n third index values and the Morton code lookup table, the decoder may further determine the Morton code of the current point according to the n Morton code components corresponding to each coordinate component.

Specifically, in the embodiment of the present application, when the decoder performs the above act 204, that is, when the decoder determines the Morton code of the current point according to the Morton code components, the decoder may first determine n interval Morton codes of the current point according to the n first Morton code components, the n second Morton code components and the n third Morton code components; and then determine the Morton code of the current point according to the n interval Morton codes.

It can be understood that in the embodiment of the present application, since the decoder determines the n index values based on the right-shifted components, when the n Morton code components are processed subsequently after the n Morton code components are acquired by looking up the Morton code lookup table according to the n index values, the decoder further needs to perform left shift processing accordingly.

Specifically, in the embodiment of the present application, the specific number of bits by which the decoder performs left shift processing is related to the number of bits by which the decoder performs the above right shift processing and the corresponding bit width interval.

Illustratively, in the embodiment of the present application, assuming that the binary bit width of the first coordinate component is 8, the binary bit width of the second coordinate component is 8, and the binary bit width of the third coordinate component is 8, the preset number of bits of the right shift processing is 16. Then, after the geometric information (x, y, z) of the current point is determined, the decoder may shift each coordinate component in the geometric information rightwards by the preset number of bits, that is, shift the binary number of the first coordinate component x, the binary number of the second coordinate component y and the binary number of the third coordinate component z respectively rightwards by 16 bits, so as to obtain the right-shifted first component corresponding to the first coordinate component x, the right-shifted second component corresponding to the second coordinate component y and the right-shifted third component corresponding to the third coordinate component z.

It can be understood that in the present application, after the right shift processing is performed, the bit widths of the right-shifted first component corresponding to x, the right-shifted second component corresponding to y and the right-shift third component corresponding to z are all 24, in this case it may be considered that m is 8 and n is 3.

Further, in the embodiment of the present application, the decoder may determine one first index value corresponding to the first coordinate component x according to the most significant 8-bit of the right-shifted first component, and then look up the Morton code lookup table using the first index value to obtain one first Morton code component corresponding to the most significant 8-bit of the right-shifted first component.

Specifically, in the present application, the decoder may first look up the Morton code lookup table using the first index value to obtain one Morton code mx corresponding to the corresponding index value, and then shift the Morton code mx corresponding to the index value leftwards by 2 bits to obtain one first Morton code component Mx, corresponding to the first index value, of the first coordinate component x.

Accordingly, in the present application, the decoder may also determine one second index value corresponding to the second coordinate component y according to the most significant 8-bit of the right-shifted second component, and then look up the Morton code lookup table using the second index value to obtain one second Morton code component corresponding to the most significant 8-bit of the right-shifted second component.

Specifically, in the present application, the decoder may first look up the Morton code lookup table using the second index value to obtain one Morton code my corresponding to the corresponding index value, and then shift the Morton code my corresponding to the index value leftwards by 1 bit to obtain one second Morton code component My, corresponding to the second index value, of the second coordinate component y.

Accordingly, in the present application, the decoder may also determine one third index value corresponding to the third coordinate component z according to the most significant 8-bit of the right-shifted third component, and then look up the Morton code lookup table using the third index value to obtain one third Morton code component corresponding to the most significant 8-bit of the right-shifted third component.

Specifically, in the present application, the decoder may first look up the Morton code lookup table using the third index value to obtain one Morton code mz corresponding to the corresponding index value, and then directly generate one third Morton code component Mz, corresponding to the third index value, of the third coordinate component z according to the Morton code mz corresponding to the index value.

Further, in an embodiment of the present application, after one first Morton code component, one second Morton code component and one third Morton code component corresponding to a bit width interval of the most significant 8-bit are determined, the decoder may further generate one interval Morton code corresponding to the bit width interval of the most significant 8-bit according the three Morton code components.

It should be noted that in the present application, before the three index values of the three coordinate components corresponding to the bit width interval of the most significant 8-bit are generated, the three coordinate components are shifted rightwards by 16 bits respectively, so corresponding left shift processing needs to be performed when the interval Morton code is generated.

Specifically, in the embodiment of the present application, the decoder may perform bit interleaving on the three coordinate components corresponding to the bit width interval of the most significant 8-bit in an order of x, y and z to obtain an interleaved binary number, a bit width of which is 24, and then shift the interleaved binary number leftwards by 48, i.e., (16×3), bits to obtain an interval Morton code corresponding to the bit width interval of the most significant 8-bit.

Further, in the embodiment of the present application, the decoder may also continue to determine three index values of the three coordinate components corresponding to a bit width interval of (3-2) intermediate 8-bit in the manner described above, then obtain three Morton code components corresponding to the bit width interval of intermediate 8-bit based on the Morton code lookup table, and finally obtain an interval Morton code corresponding to the bit width interval of intermediate 8-bit using the three Morton code components.

Specifically, in the embodiment of the present application, the decoder may perform bit interleaving on the three coordinate components corresponding to the bit width interval of intermediate 8-bit in an order of x, y and z to obtain an interleaved binary number, a bit width of which is 24, and then shift the interleaved binary number leftwards by 24 bit (8×3) to obtain an interval Morton code corresponding to the bit width interval of intermediate 8-bit.

Further, in the embodiment of the present application, the decoder may also continue to determine three index values of the three coordinate components corresponding to a bit width interval of the least significant 8-bit in the manner described above, then obtain three Morton code components corresponding to the bit width interval of the least significant 8-bit based on the Morton code lookup table, and finally obtain an interval Morton code corresponding to the bit width interval of the least significant 8-bit using the three Morton code components.

Specifically, in the embodiment of the present application, the decoder may perform bit interleaving on the three coordinate components corresponding to the bit width interval of the least significant 8-bit in an order of x, y and z to obtain an interleaved binary number, a bit width of which is 24, and then determine directly the interleaved binary number to be an interval Morton code corresponding to the bit width interval of the least significant 8-bit.

It can be understood that in the embodiment of the present application, after the decoder determines three interval Morton codes corresponding to all the three bit width intervals constituting 24 bits, the decoder may perform bitwise XOR operation on the three interval Morton codes and determine the value obtained through the XOR operation to be the Morton code of the current point.

An example of implementation of the above method will be illustrated below in C/C++ programming language:

```
inline int64_t
mortonAddr (const int32_t x, const int32_t y, const int32_t z)
{
    assert (x>= 0&& >=0&&z>=0);
    int64_t mortonCode = (kMortonCode256[(x>>16)&0xFF]<<2)
        |(kMortonCode256[(y>>16)&0xFF] <1)
        |KMortonCode 256[(z>>16)&0xFF];
    mortonCode =
    mortonCode<<24|(kMortonCode256[(x>>8)&0xFF]<<2)
        |(kMortonCode256[(y>>8)&0xFF]<<1)
        |kMortonCode256[(z>>8)&0xFF];
    mortonCode = mortonCode<<24|(kMortonCode256[x&0xFF]<<2)
        |(kMortonCode256[y&0xFF]<<1)
        |kMortonCode256[z&0xFF];
    return mortonCode;
}
```

Herein int64_t represents a data type of a 64-bit integer; int32_t represents a data type of a 32-bit integer; (x, y, z) is an input coordinate of a certain point in a point cloud, that is, the geometric information; kMortonCode256[ ] is a unique lookup table used when the Morton code is acquired, that is, the Morton code lookup table; and variable mortonCode is a Morton code of the input coordinate (x, y, z) of the point.

It can be understood that in the embodiment of the present application, the bit widths corresponding to the first coordinate component, the second coordinate component and the third coordinate component of the current point may be any integer greater than 0, which is not specifically limited in the present application.

It can be understood that in the embodiment of the present application, the preset number of bits by which the decoder performs right shift processing may be any integer greater than 0, which is not specifically limited in the present application.

It can be understood that in the embodiment of the present application, the bit width of the right-shifted coordinate component is (m×n) and may be disassembled into n bit width intervals of m-bit, wherein m and n may be integers greater than 1, which is not specifically limited in the present application.

The embodiment of the present application discloses a method for constructing a Morton code. The decoder parses a bitstream to determine geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

Figure 7:
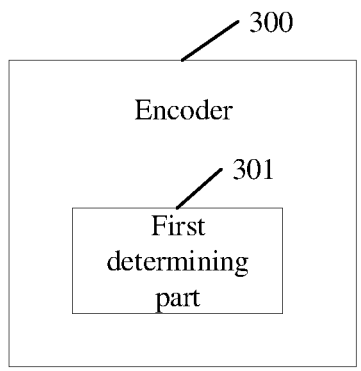
FIG. 7 is a schematic block diagram of a first structure of an encoder.

Based on the embodiments described above, a further embodiment of the present application provides an encoder. FIG. 7 is a schematic block diagram of a first structure of an encoder. As shown in FIG. 7, the encoder 300 in accordance with the embodiment of the present application may include a first determining part 301.

The first determining part 301 is configured to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

Figure 8:
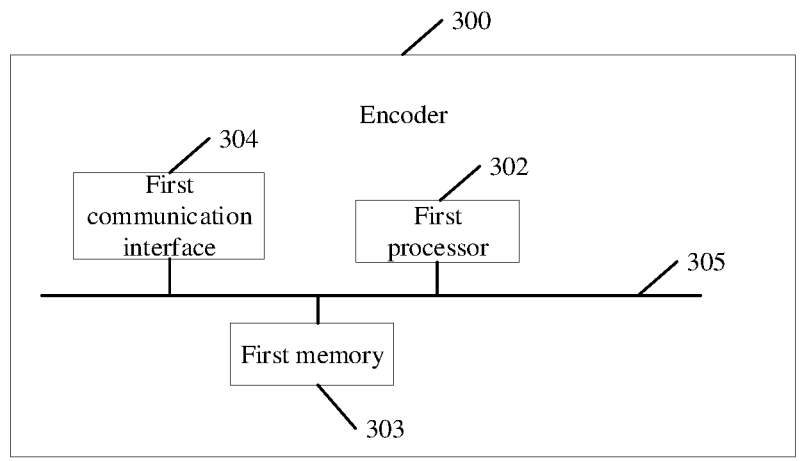
FIG. 8 is a schematic block diagram of a second structure of an encoder.

FIG. 8 is a schematic block diagram of a second structure of an encoder. As shown in FIG. 8, the encoder 300 in accordance with the embodiment of the present application may include a first processor 302, a first memory 303 storing instructions executable by the first processor 302, a first communication interface 304, and a first bus 305 used to connect to the first processor 302, the first memory 303 and the first communication interface 304.

Further, in the embodiment of the present application, the first processor 302 is configured to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

Figure 9:
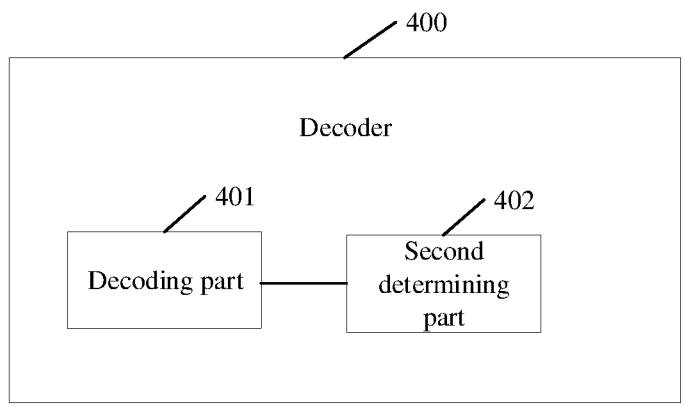
FIG. 9 is a schematic block diagram of a first structure of a decoder.

FIG. 9 is a schematic block diagram of a first structure of a decoder. As shown in FIG. 9, the decoder 400 in accordance with an embodiment of the present application may include a decoding part 401 and a second determining part 402.

The decoding part 401 is configured to parse a bitstream.

The second determining part 402 is configured to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

Figure 10:
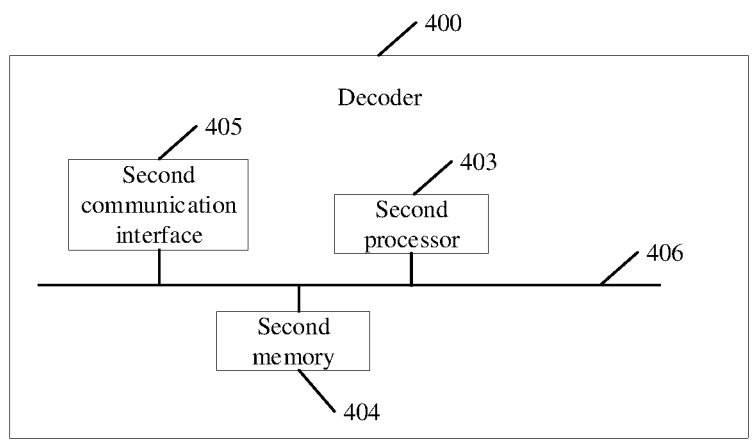
FIG. 10 is a schematic block diagram of a second structure of a decoder.

FIG. 10 is a schematic block diagram of a second structure of a decoder. As shown in FIG. 10, the decoder 400 in accordance with the embodiment of the present application may include a second processor 403, a second memory 404 storing instructions executable by the second processor 403, a second communication interface 405, and a second bus 406 used to connect to the second processor 403, the second memory 404 and the second communication interface 405.

Further, in the embodiment of the present application, the second processor 403 is configured to parse a bitstream to determine geometric information of a current point in a point cloud; determine an index value corresponding to a coordinate component according to the coordinate component in the geometric information; determine a Morton code component corresponding to the coordinate component according to the index value and a Morton code lookup table; and determine a Morton code of the current point according to the Morton code component.

The encoder 300 may be a computing device having one or more chips. Units implemented as integrated circuits on the chip and having the above functions have similar functions, similar connections and data exchange to the corresponding units in FIG. 1.

The decoder 400 may be a computing device having one or more chips. Units implemented as integrated circuits on the chip and having the above functions have similar functions, similar connections and data exchange to the corresponding units in FIG. 2.

In addition, various functional modules in the embodiments may be integrated into one processing unit, or various units may physically exist separately, or two or more than two units may be integrated into one unit. The integrated unit may be implemented in a form of hardware, or may be implemented in a form of a software functional module.

The integrated unit, if implemented in a form of a software functional module and sold or used as an independent product, may be stored in a computer-readable storage medium. Based on such understanding, the technical schemes of the embodiments, in essence, or the part contributing to the prior art, or all or part of the technical schemes, may be embodied in a form of a software product, which is stored in a storage medium, and includes several instructions to cause a computer device (which may be a personal computer, a server or a network device, or the like) or a processor to perform all or part of acts of the methods in accordance with the embodiments. The aforementioned storage medium includes various media, such as a U disk, a mobile hard disk, a ROM, a RAM, a magnetic disk or an optical disk, which are capable of storing program codes.

The embodiments of the present application provide an encoder and a decoder. The encoder determines geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. The encoder parses a bitstream to determine geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

An embodiment of the present application provides a computer-readable storage medium having stored thereon a program. When the program is executed by a processor, the methods described in the above embodiments are implemented.

Specifically, program instructions corresponding to a method for constructing a Morton code in the embodiment may be stored on a storage medium, such as an optical disk, a hard disk or a U disk. When the program instructions corresponding to the method for constructing the Morton code in the storage medium are read or executed by an electronic device, the following acts are included: determining geometric information of a current point in a point cloud; determining an index value corresponding to a coordinate component according to the coordinate component in the geometric information; determining a Morton code component corresponding to the coordinate component according to the index value and a Morton code lookup table; and determining a Morton code of the current point according to the Morton code component.

When the program instructions corresponding to the method for constructing the Morton code in the storage medium are read or executed by an electronic device, the following acts are included: parsing a bit stream to determine geometric information of a current point in a point cloud; determining an index value corresponding to a coordinate component according to the coordinate component in the geometric information; determining a Morton code component corresponding to the coordinate component according to the index value and a Morton code lookup table; and determining a Morton code of the current point according to the Morton code component.

It should be understood by a person skilled in the art that the embodiments of the present application may be provided as methods, systems or computer program products. Therefore, the present application may use the form of a hardware embodiment, a software embodiment or an embodiment combining software and hardware. Moreover, the present application may use the form of a computer program product implemented on one or more computer accessible storage media (including, but not limited to, a magnetic disk memory, an optical memory, etc.) containing computer accessible program codes.

The present application is described with reference to implementation flowcharts and/or block diagrams of the methods, devices (systems) and computer program products in accordance with the embodiments of the present application. It should be understood that each flow and/or block in the flowcharts and/or the block diagrams, and combinations of flows and/or blocks in the flowcharts and/or the block diagrams may be implemented by computer program instructions. These computer program instructions may be provided to a processor of a general purpose computer, a special purpose computer, an embedded processing machine or any other programmable data processing device to generate a machine, such that instructions, which are executed by the processor of the computer or any other programmable data processing device, generate an apparatus for implementing functions specified in one or more flows in the implementation flowcharts and/or one or more blocks in the block diagrams.

These computer program instructions may also be stored in a computer-readable memory that can instruct a computer or other programmable data processing devices to operate in a particular manner, such that the instructions stored in the computer-readable memory generate an article of manufacture including an instruction apparatus, wherein the instruction apparatus implements functions specified in one or more flows in the implementation flowcharts and/or one or more blocks in the block diagrams.

These computer program instructions may also be loaded onto a computer or other programmable data processing devices to enable the computer or other programmable devices to perform a series of operation acts to generate computer-implemented processing, such that the instructions executed on the computer or other programmable devices provide acts for implementing functions specified in one or more flows in the implementation flowcharts and/or one or more blocks in the block diagrams.

What are described above are merely preferred embodiments of the present application and are not intended to limit the protection scope of the present application.

INDUSTRIAL APPLICABILITY

The embodiments of the present application provide a method for constructing a Morton code, an encoder, a decoder and a computer storage medium. The encoder determines geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. The decoder parses a bitstream to determine geometric information of a current point in a point cloud; determines an index value corresponding to a coordinate component according to the coordinate component in the geometric information; determines a Morton code component corresponding to the coordinate component according to the index value and a Morton code lookup table; and determines a Morton code of the current point according to the Morton code component. It can be seen that in the embodiments of the present application, when the Morton code of the current point is constructed, the encoder and the decoder may look up the same Morton code lookup table using the index value corresponding to each coordinate component in the geometric information of the current point, to obtain each Morton code component corresponding to each coordinate component, so that the Morton code of the current point may be constructed using all Morton code components. It is thus clear that since the encoder and the decoder can only store and use one Morton code lookup table, the computational complexity and storage space can be reduced effectively, thereby improving the encoding and decoding efficiency.

What is claimed is:

1. A method for constructing a Morton code, applied in an encoder, comprising:
   determining geometric information of a current point in a point cloud;
   determining a Morton code of the current point according to the geometric information of the current point and a Morton code lookup table; wherein Morton code lookup tables for determining Morton codes of points with different numbers of dimensions are a same Morton code lookup table;
   wherein determining the Morton code of the current point according to the geometric information of the current point and the Morton code lookup table comprises:
      determining an index value corresponding to a coordinate component according to the coordinate component in the geometric information;
      determining a Morton code component corresponding to the coordinate component according to the index value and the Morton code lookup table; and
      determining the Morton code of the current point according to the Morton code component;
   wherein determining the Morton code component corresponding to the coordinate component according to the index value and the Morton code lookup table comprises:
      determining a Morton code corresponding to the index value based on the Morton code lookup table; and
      performing bit-shifting on the Morton code corresponding to the index value to obtain the Morton code component corresponding to the coordinate component;
   wherein upon determining that the geometric information of the current point comprises a plurality of coordinate components, Morton code lookup tables for determining Morton code components corresponding to the plurality of coordinate components are a same Morton code lookup table.

2. The method according to claim 1, wherein the coordinate component in the geometric information comprises a first coordinate component, a second coordinate component and a third coordinate component; and
   if the geometric information is represented as (x, y, z), x is the first coordinate component, y is the second coordinate component, and z is the third coordinate component.

3. The method according to claim 2, wherein for the first coordinate component in the geometric information,
   a first index value corresponding to the first coordinate component is determined;
   the Morton code lookup table is looked up to obtain a Morton code corresponding to the first index value; and
   the Morton code corresponding to the first index value is shifted leftwards by 2 bits to obtain a first Morton code component corresponding to the first coordinate component;
   or
   for the second coordinate component in the geometric information, a second index value corresponding to the second coordinate component is determined;

the Morton code lookup table is looked up to obtain a Morton code corresponding to the second index value; and the Morton code corresponding to the second index value is shifted leftwards by 1 bit in binary to obtain a second Morton code component corresponding to the second coordinate component;

or for the third coordinate component in the geometric information, a third index value corresponding to the third coordinate component is determined;

the Morton code lookup table is looked up to obtain a Morton code corresponding to the third index value; and a third Morton code component corresponding to the third coordinate component is determined according to the Morton code corresponding to the third index value.

4. The method according to claim 1, wherein shifting the Morton code corresponding to the index value to obtain the Morton code component corresponding to the coordinate component comprises:

shifting the Morton code corresponding to the index value leftwards by K bits to obtain the Morton code component, wherein K is an integer greater than or equal to 0; and determining the Morton code of the current point according to the Morton code component comprises:

performing bitwise XOR operation on the Morton code component corresponding to the coordinate component in the geometric information to obtain the Morton code of the current point.

5. The method according to claim 2, wherein determining the index value corresponding to the coordinate component according to the coordinate component in the geometric information comprises:

shifting the first coordinate component, the second coordinate component and the third coordinate component respectively rightwards by a preset number of bits, to obtain a right-shifted first component, a right-shifted second component and a right-shifted third component, wherein bit widths of the right-shifted first component, the right-shifted second component and the right-shifted third component are all m×n; m and n are integers greater than 1;

determining sequentially n first index values corresponding to the first coordinate component according to a most significant m-bit, n−2 intermediate m-bits and a least significant m-bit of the right-shifted first component;

determining sequentially n second index values corresponding to the second coordinate component according to the most significant m-bit, the n−2 intermediate m-bits and the least significant m-bit of the right-shifted second component; and determining sequentially n third index values corresponding to the third coordinate component according to the most significant m-bit, the n−2 intermediate m-bits and the least significant m-bit of the right-shifted third component;

wherein determining the Morton code component corresponding to the coordinate component based on the index value and the Morton code lookup table comprises:

determining n first Morton code components corresponding to the first coordinate component, n second Morton code components corresponding to the second coordinate component and n third Morton code components corresponding to the third coordinate component according to the n first index values, the n second index values, the n third index values and the Morton code lookup table;

wherein determining the Morton code of the current point according to the Morton code component comprises:

determining n interval Morton codes of the current point according to the n first Morton code components, the n second Morton code components and the n third Morton code components; and determining the Morton code of the current point according to the n interval Morton codes.

6. The method according to claim 1, further comprising:

determining a reference point of the current point in the point cloud based on the Morton code of the current point and a point cloud sequence set corresponding to the point cloud;

determining an attribute prediction value of the current point according to an attribute reconstruction value of the reference point; and generating the point cloud sequence set according to all Morton codes corresponding to all points in the point cloud.

7. The method according to claim 6, further comprising:

calculating a prediction residual of the current point according to the attribute prediction value; and encoding the prediction residual to generate a bitstream.

8. A method for decoding of a point cloud, applied in a decoder, comprising:

parsing a bitstream to determine geometric information of a current point in the point cloud;

determining a Morton code of the current point according to the geometric information of the current point and a Morton code lookup table; wherein Morton code lookup tables for determining Morton codes of points with different numbers of dimensions are a same Morton code lookup table;

wherein determining the Morton code of the current point according to the geometric information of the current point and the Morton code lookup table comprises:

determining an index value corresponding to a coordinate component according to the coordinate component in the geometric information;

determining a Morton code component corresponding to the coordinate component according to the index value and the Morton code lookup table; and determining the Morton code of the current point according to the Morton code component;

wherein determining the Morton code component corresponding to the coordinate component according to the index value and the Morton code lookup table comprises:

determining a Morton code corresponding to the index value based on the Morton code lookup table; and performing bit-shifting on the Morton code corresponding to the index value to obtain the Morton code component corresponding to the coordinate component;

wherein upon determining that the geometric information of the current point comprises a plurality of coordinate components, Morton code lookup tables for determining Morton code components corresponding to the plurality of coordinate components are a same Morton code lookup table.

9. The method according to claim 8, wherein the coordinate component in the geometric information comprises a first coordinate component, a second coordinate component and a third coordinate component.

10. The method according to claim 9, wherein if the geometric information is represented as (x, y, z), x is the first coordinate component, y is the second coordinate component, and z is the third coordinate component.

11. The method according to claim 9, wherein for the first coordinate component in the geometric information,
a first index value corresponding to the first coordinate component is determined;
the Morton code lookup table is looked up to obtain a Morton code corresponding to the first index value; and
the Morton code corresponding to the first index value is shifted leftwards by 2 bits to obtain a first Morton code component corresponding to the first coordinate component;
or
for the second coordinate component in the geometric information,
a second index value corresponding to the second coordinate component is determined;
the Morton code lookup table is looked up to obtain a Morton code corresponding to the second index value; and
the Morton code corresponding to the second index value is shifted leftwards by 1 bit to obtain a second Morton code component corresponding to the second coordinate component;
or
for the third coordinate component in the geometric information,
a third index value corresponding to the third coordinate component is determined;
the Morton code lookup table is looked up to obtain a Morton code corresponding to the third index value; and
a third Morton code component corresponding to the third coordinate component is determined according to the Morton code corresponding to the third index value.

12. The method according to claim 8, wherein shifting the Morton code corresponding to the index value to obtain the Morton code component corresponding to the coordinate component comprises:
shifting the Morton code corresponding to the index value leftwards by K bits to obtain the Morton code component, wherein K is an integer greater than or equal to 0.

13. The method according to claim 12, wherein determining the Morton code of the current point according to the Morton code component comprises:
performing bitwise XOR operation on the Morton code component corresponding to the coordinate component in the geometric information to obtain the Morton code of the current point.

14. The method according to claim 9, wherein determining the index value corresponding to the coordinate component according to the coordinate component in the geometric information comprises:
shifting the first coordinate component, the second coordinate component and the third coordinate component respectively rightwards by a preset number of bits, to obtain a right-shifted first component, a right-shifted second component and a right-shifted third component,
wherein bit widths of the right-shifted first component, the right-shifted second component and the right-shifted third component are all m×n; m and n are integers greater than 1;
determining sequentially n first index values corresponding to the first coordinate component according to a most significant m-bit, n−2 intermediate m-bits and a least significant m-bit of the right-shifted first component;
determining sequentially n second index values corresponding to the second coordinate component according to the most significant m-bit, the n−2 intermediate m-bits and the least significant m-bit of the right-shifted second component; and
determining sequentially n third index values corresponding to the third coordinate component according to the most significant m-bit, the n−2 intermediate m-bits and the least significant m-bit of the right-shifted third component;
wherein determining the Morton code component corresponding to the coordinate component based on the index value and the Morton code lookup table comprises:
determining n first Morton code components corresponding to the first coordinate component, n second Morton code components corresponding to the second coordinate component and n third Morton code components corresponding to the third coordinate component according to the n first index values, the n second index values, the n third index values and the Morton code lookup table.

15. The method according to claim 14, wherein determining the Morton code of the current point according to the Morton code component comprises:
determining n interval Morton codes of the current point according to the n first Morton code components, the n second Morton code components and the n third Morton code components; and
determining the Morton code of the current point according to the n interval Morton codes.

16. The method according to claim 8, further comprising:
determining a reference point of the current point in the point cloud based on the Morton code of the current point and a point cloud sequence set corresponding to the point cloud;
determining an attribute prediction value of the current point according to an attribute reconstruction value of the reference point; and
generating the point cloud sequence set according to all Morton codes corresponding to all points in the point cloud.

17. The method according to claim 16, further comprising:
parsing the bitstream to determine a prediction residual of the current point; and
determining a reconstruction value of the current point according to the attribute prediction value and the prediction residual.

18. A decoder, comprising a processor, wherein
the processor is configured to parse a bitstream;
the processor is further configured to determine geometric information of a current point in a point cloud; and determine a Morton code of the current point according to the geometric information of the current point and a Morton code lookup table; wherein Morton code lookup tables for determining Morton codes of points with different numbers of dimensions are a same Morton code lookup table;

wherein the processor is further configured to determine the Morton code of the current point according to the geometric information of the current point and the Morton code lookup table by:

determining an index value corresponding to a coordinate component according to the coordinate component in the geometric information;

determining a Morton code component corresponding to the coordinate component according to the index value and the Morton code lookup table; and determining the Morton code of the current point according to the Morton code component;

wherein the processor is further configured to determine the Morton code component corresponding to the coordinate component according to the index value and the Morton code lookup table by:

determining a Morton code corresponding to the index value based on the Morton code lookup table; and performing bit-shifting on the Morton code corresponding to the index value to obtain the Morton code component corresponding to the coordinate component;

wherein upon determining that the geometric information of the current point comprises a plurality of coordinate components, Morton code lookup tables for determining Morton code components corresponding to the plurality of coordinate components are a same Morton code lookup table.

* * * * *